United States Patent
Coulbeck et al.

(10) Patent No.: US 12,338,361 B2
(45) Date of Patent: *Jun. 24, 2025

(54) MULTI-AMINE POLYESTER DISPERSANT MADE VIA AN ANHYDRIDE INTERMEDIATE

(71) Applicant: Lubrizol Advanced Materials, Inc., Cleveland, OH (US)

(72) Inventors: Elliot Coulbeck, Bury (GB); Dean Thetford, Rochdale (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 836 days.

This patent is subject to a terminal disclaimer.

(21) Appl. No.: 17/438,659

(22) PCT Filed: Mar. 13, 2020

(86) PCT No.: PCT/US2020/022523
§ 371 (c)(1),
(2) Date: Sep. 13, 2021

(87) PCT Pub. No.: WO2020/186126
PCT Pub. Date: Sep. 17, 2020

(65) Prior Publication Data
US 2022/0154039 A1    May 19, 2022

Related U.S. Application Data

(60) Provisional application No. 62/818,300, filed on Mar. 14, 2019.

(51) Int. Cl.
| | |
|---|---|
| *C08G 81/00* | (2006.01) |
| *C08G 73/02* | (2006.01) |
| *C09D 7/45* | (2018.01) |
| *C09D 179/02* | (2006.01) |

(52) U.S. Cl.
CPC ......... *C09D 179/02* (2013.01); *C08G 73/024* (2013.01); *C08G 81/00* (2013.01); *C09D 7/45* (2018.01)

(58) Field of Classification Search
USPC ......................................................... 528/332
See application file for complete search history.

(56) References Cited

U.S. PATENT DOCUMENTS

| | | |
|---|---|---|
| 6,197,877 B1 | 3/2001 | Thetford et al. |
| 6,787,600 B1 | 9/2004 | Thetford |
| 7,348,367 B2 | 3/2008 | Thetford |
| 7,767,750 B2 * | 8/2010 | Thetford ............ H01M 10/443 524/217 |
| 2010/0174046 A1 | 7/2010 | Liu et al. |
| 2016/0215160 A1 | 7/2016 | Coulbeck et al. |
| 2019/0153245 A1 * | 5/2019 | Pirrung ................. C09K 23/46 |

FOREIGN PATENT DOCUMENTS

| | | |
|---|---|---|
| EP | 0208041 A2 | 1/1987 |
| WO | 2006113258 A2 | 10/2006 |
| WO | 2014/172856 | 10/2014 |
| WO | 2017/125290 | 7/2017 |

* cited by examiner

*Primary Examiner* — Terressa Boykin
(74) *Attorney, Agent, or Firm* — Eryn Ace Fuhrer; Michael A. Miller

(57) ABSTRACT

The present invention relates to a dispersant derived from an alcohol terminated polymer and via an anhydride intermediate. The anhydride functionalized polyester is then reacted with a multi-amine species forming amide and salt bonds.

27 Claims, No Drawings

MULTI-AMINE POLYESTER DISPERSANT MADE VIA AN ANHYDRIDE INTERMEDIATE

CROSS REFERENCE TO RELATED APPLICATION

This application claims priority from PCT Application Serial No. PCT/US2020/022523 filed on Mar. 13, 2020, which claims the benefit of U.S. Provisional Application No. 62/818,300 filed on Mar. 14, 2019, the entirety of both of which is hereby incorporated by reference.

FIELD OF INVENTION

The present invention relates to a dispersant of a multi-amine species (a polyamine such as polyethyleneimine) reacted with polyester and/or polyether chains and a method of making the dispersant via an anhydride intermediate.

BACKGROUND OF THE INVENTION

Polyamine derived dispersants are generally understood to be effective as pigment dispersants. The composition and molecular weight of the steric stabilization chains of these dispersants are important to effectively disperse solids in continuous media, both polar and non-polar. Many formulations such as inks, paints, millbases and plastics materials require dispersants for uniformly distributing particulate solids in organic media. Therefore, it is desirable for pigment dispersions to be compatible with different ink or coating formulations.

It has also been found that multi-amine based dispersants having a mixture of salt and amide linkages provide more effective dispersants. However, these dispersants can be difficult to make using alcohol terminated polymers. It would be desirable to have dispersants which include both internal salt and amide linkages, but that can conveniently be prepared from alcohol terminated polyether and/or polyester based polymers.

SUMMARY OF THE INVENTION

The present invention provides a method of preparing a dispersant having the formula

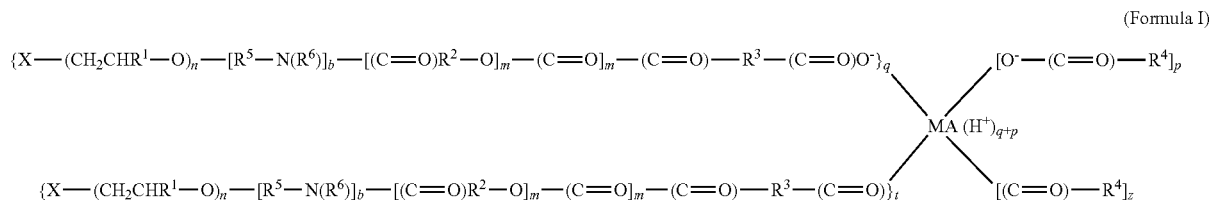
(Formula I)

from an alcohol terminated polymer. The method of preparing the dispersant of Formula I includes the steps of (a) providing an alcohol terminated polymer of the formula X-(CH$_2$CHR$^1$—O)$_n$—[R$^5$—N(R$^6$)]$_b$—[(C=O)R$^2$—O]$_m$—H (Formula II), (b) reacting the alcohol ended polymer with a cyclic anhydride to provide an acid terminated polymer, (c) reacting the acid terminated polymer with a non-cyclic anhydride to provide a mixture of anhydrides, and (d) reacting the mixture of anhydrides with a multi-amine species, wherein the multi-amine species has a number average molecular weight of 300 to 20,000 to form a dispersant molecule, wherein q and t are each at least one such that the dispersant contains both amide and salt linkages. In Formula II, X represents either R-Q or a cyclic secondary amine. When X is R-Q, R is a branched or linear, saturated or unsaturated, or cyclic hydrocarbon chain containing 1 to 50 carbon atoms, Q is O, or NR$^7$, or NH, with the proviso that Q can only be NH when n is 0 and b is 0, and R$^7$ is a linear or branched, saturated or unsaturated hydrocarbon chain containing between 1 and 18 carbon atoms, which may optionally contain ether, ester, or amide functional groups or a halide substituent. Alternatively, X may also be a cyclic amine structure derived from one or more cyclic secondary amines. In Formula II, R$^1$ is H, methyl, or ethyl, R$^5$ is a linear or branched hydrocarbon chain containing up to 3 carbon atoms; R$^6$ is hydrogen, a hydrocarbyl group containing 1 to 22 carbon atoms, or the residue of an alkyl (meth)acrylate or (meth) acrylamide. The variable b is 0 or 1, with the proviso that b can only be 1 when both n and m are both at least 1. R$^2$ is a linear or branched, saturated or unsaturated, hydrocarbon chain containing 1 to 15 carbon atoms or —R$^8$(C=O)YR$^9$—, where Y is O or NH or NR$^{10}$, R$^8$ is a hydrocarbon chain containing 1 to 10 carbon atoms, R$^9$ is a hydrocarbon chain containing 2 to 10 carbon atoms, and R$^{10}$ is a hydrocarbon chain containing 1 to 20 carbon atoms. In some embodiments, R$^{10}$ may include an ester, ether, or amide group. When R$^2$ is a hydrocarbon chain containing 1 to 15 carbon atoms, R$^2$ may be, in one embodiment, a linear or branched, saturated or unsaturated, hydrocarbon chain containing 1 to 10 carbon atoms, and in another embodiment, R$^2$ may be a hydrocarbon chain containing 2 to 15 carbon atoms which includes an amide functional group having the formula, —N(R$^{11}$)—(C=O)—, where R$^{11}$ is H or a hydrocarbon chain containing 1 to 4 carbon atoms. In Formula II, n is any integer from 0 to 65 and m is any integer from 0 to 35, with the proviso that m+n is at least 3.

The invention also provides a dispersant having the structure of Formula I, wherein X is R-Q or a cyclic amine. Where X is R-Q, R is a hydrocarbon chain containing 1 to 50 carbon atoms, Q is O, or NR$^7$ or NH, with the proviso that Q can only be NH when n is 0 and b is 0, and R$^7$ is a linear or branched hydrocarbon chain containing between 1 and 18 carbon atoms, which may optionally contain ether, ester, or amide functional groups or a halide substituent. X may also represent a cyclic secondary amine. In Formula I, R$^1$ is H, methyl, or ethyl; R$^5$ is a linear or branched hydrocarbon chain containing up to 3 carbon atoms; R$^6$ is hydrogen, a hydrocarbyl group containing 1 to 50 carbon atoms, or the residue of an alkyl (meth)acrylate or (meth) acrylamide; b is 0 or 1, with the proviso that b can only be 1 when both n and m are both at least 1; R$^2$ is a linear or branched, saturated or unsaturated, hydrocarbon chain containing 1 to 15 carbon atoms or —R$^8$(C=O)YR$^9$—, where Y is O or NH or NR$^{10}$, R$^8$ is a hydrocarbon chain containing 1 to 10 carbon atoms, R$^9$ is a hydrocarbon chain containing 1 to 10 carbon atoms, and $R^{10}$ is a hydrocarbon chain containing 1 to 20 carbon atoms, which may include an ester, ether, or amide group. When $R^2$ is a hydrocarbon chain containing 1 to 15 carbon atoms, $R^2$ may be, in one embodiment, a linear or branched, saturated or unsaturated, hydrocarbon chain containing 1 to 10 carbon atoms, and in another embodiment, $R^2$ may be a hydrocarbon chain containing 2 to 15 carbon atoms which includes an amide functional group having the formula, —N($R^{11}$)—(C=O)—, where $R^{11}$ is H or a hydrocarbon chain containing 1 to 4 carbon atoms. The variable n is any integer from 0 to 65 and the variable m is any integer from 0 to 35, with the proviso that m+n is at least 3. $R^3$ is a linear or branched, saturated or unsaturated hydrocarbon containing between 2 and 80 carbons. The variables q and t are each at least 1, while q+t may be any integer from 2 to 150. MA is a multi-amine species having a number average molecular weight of 300 to 20,000 g/mol. The variables p or z could each be 0, or p+z may be 0, or any integer from 1 or 2 to 200; $R^4$ is linear or branched, saturated carbon chain containing between 1 and 4 carbons, for example, between 1 and 3. In one embodiment, in Formula I, n is 0. In another embodiment, in Formula I, n is any integer from 3 to 65 and m is 0. In still another embodiment, in Formula I, m is 0. In another embodiment, in Formula I, m is any integer from 3 to 35, for example, 5 to 16, and n is 0. In another embodiment, in Formula I, both n and m are positive integers and n+m is 3 to 65, for example 5 to 30.

DETAILED DESCRIPTION OF THE INVENTION

In the following detailed description and in the claims, the term "hydrocarbyl" will refer to monovalent hydrocarbon groups that may optionally include other heteroatoms (such as O and N) in conventional or specified amounts such as one oxygen and or nitrogen for every two or every ten carbon atoms in the group, but preferably just carbon and hydrogen. When used broadly herein, the term "hydrocarbon chain" will refer to a compound comprising carbon and hydrogen which includes variants that are branched, linear, saturated, unsaturated, or ring structures. Hydrocarbon chains may, optionally, include other atoms, such as heteroatoms including Oxygen in the form of ether groups, or Nitrogen in the form of amide groups.

The present invention is directed to a dispersant of the following structure:

or O atoms, which are present as tertiary amine or ether groups, or mixtures thereof. In some embodiments, the hydrocarbon chain may be selected from alkyl, aryl, aralkyl, or alkylaryl hydrocarbon chains. In one embodiment, R is aryl including naphthyl, phenyl, or biphenyl. In one embodiment R is aralkyl including 2-phenylethyl or benzyl. In one embodiment R may be alkaryl including octyl phenyl or nonyl phenyl. In another embodiment R is cycloalkyl including $C_{3-8}$-cycloalkyl, such as, cyclopropyl or cyclohexyl.

In Formula I, Q represents O, $NR^7$, or NH, with the proviso that Q can only be NH when n is 0 and b is 0. $R^7$ may be a linear or branched, saturated or unsaturated, hydrocarbon chain containing between 1 and 18 carbon atoms, which may optionally contain ether, ester, or amide functional groups, or a halide substituent. In some embodiments, $R^7$ may also be derived from acrylate, methacrylate, acrylamide or methacrylamide.

In another embodiment, R-Q is derived from alcohols or amines or mixtures thereof. Useful alcohols include but are not limited to methanol, ethanol, n-propanol, n-butanol, neopentyl alcohol, n-hexanol, n-heptanol, n-octanol, n-decanol, n-dodecanol, n-tetradecanol, n-hexadecanol, oleyl alcohol, n-octadecanol, isopropanol, isobutanol, tert-butanol, 2-ethylbutanol, 2-ethylhexanol, 3 heptanol, 3,5,5-trimethylhexanol, 3,7-dimethyloctanol, cyclohexanol, cyclopentanol, cyclopentanemethanol, cyclohexylmethanol, 4-cyclohexyl-1-butanol, 4-ethylcyclohexanol, cycloheptanol, phenol, ortho-cresol, 2-ethylphenol, 2-propylphenol, 4-ethylphenol, octyl phenol, nonylphenol, dodecylphenol, di- and tri-styrylphenols, benzyl alcohol, 2-phenylethanol, 1-naphthol, 2-naphthol, 2-phenylphenol, 4-phenylphenol, polyisobutylene phenol, sec-phenethyl alcohol, 4-ethylbenzyl alcohol, 4-butylbenzyl alcohol, 2-naphthalenemethanol, 3-phenyl-1-propanol, 4-phenyl-1-butanol, cinnamyl alcohol and 4-propoxyphenol, 2-dimethylaminoethanol, 2-diethylaminoethanol, 2-dibutylaminoethanol, 2-propen-1-ol, allyl alcohol, 4-penten-1-ol, 2-hexen-1-ol, 3-nonen-1-ol, 7-dodecen-1-ol, 2-allyloxyethanol, 2-allylphenol, 2-vinyloxyethanol, 2-hydroxyethyl methacrylate, hydroxypropyl methacrylate, hydroxybutyl methacrylate, saturated linear alcohols commercially available under the trade name Unilin (available from Baker Hughes) and saturated branched alcohols such as the "Guerbet" alcohols which are commercially available under the trade name Isofol (available from Sasol

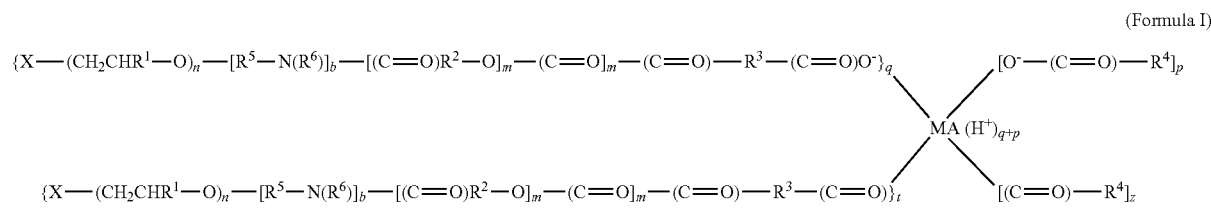

(Formula I)

The dispersant molecule notably may include a polyether species, a polyester species, or a combination of both polyether and polyester. In addition, the dispersant molecule will contain both amide and salt linkages.

In one embodiment, in Formula I, X represents a R-Q group or a cyclic amine group. When X is R-Q, R represents a branched or linear, saturated or unsaturated, hydrocarbon chain that contains 1 to 50 carbon atoms, for example, 1 to 30 carbon atoms. In one embodiment, R may optionally include halogens such as Cl or F or heteroatoms such as N GmbH) including mixtures thereof. Specific examples of commercially available Guerbet alcohols are Isofol 12, 14T, 16, 18T, 18E, 20, 24, 28, 32, 32T and 36. Useful amines include but are not limited to primary amines: methylamine, ethylamine, propylamine, butylamine, amylamine, hexylamine, heptylamine, octylamine, nonylamine, decylamine, undeylamine, dodecylamine, tridecylamine, 1-tetradecylamine, pentadecylamine, 1-hexadecylamine, octadecylamine, isopropylamine, sec-butylamine, isobutylamine, tert-butylamine, 1-methylbutylamine, 1,3-dimethylbutylamine, 3,3-dimethylbutylamine, 2-ethylhexylamine, 3-dimethylaminopropylamine, N-methylethylenediamine, N,N'-dimethylethylenediamine, cyclopentylamine, cyclohexylamine, cyclohexanemethylamine, cycloheptylamine, allylamine and oleylamine, aniline, 2-ethylaniline, 4-butylaniline, 4-cyclohexylaniline, 4-aminobiphenyl, 1-aminonaphthalene, 2-aminonaphthalene, benzylamine, phenethylamine, 3-phenyl-1-propylamine, 3-aminopropylimidazole, 4-phenylbutylamine, m-anisidine and p-phenetidine; and secondary amines: dimethylamine, N-ethylmethylamine, diethylamine, dipropylamine, diisopropylamine, N-methylbutylamine, N-methyl-tert-butylamine, dibutylamine, dihexylamine, di-(2-ethylhexyl)amine, diisobutylamine, di-nonyl amine, dipentylamine, di-dodecyl amine, dioctylamine, didodecylamine, N-methyloctadecylamine, N-methylcyclohexylamine, N-ethylcylohexylamine, dicyclohexylamine, bis(2-methoxyethyl)amine, N-methylallylamine, diallylamine, N-methylaniline, N-ethylaniline, N-butylaniline, diphenylamine, N-ethyl-1-naphthylamine, N-benzylmethylamine, dibenzylamine, N-ethylbenzylamine, and N-methylphenylamine including mixtures thereof.

When X is a cyclic amine it is derived from cyclic secondary amines. Useful cyclic secondary amines include but are not limited to piperidine, morpholine, 4-methylpiperidine, 4-phenylpiperidine, thiomorpholine, azetidine, 1-methylpiperazine, 2-methylpiperazine, and pyrrolidine including mixtures thereof.

In the present invention, the dispersant molecule of Formula I may contain polyether chains, polyester chains, polyesteramide chains or combinations of each type of chain such as polyether-co-polyester, polyether-co-polyesteramide, polyether-co-polyester-co-polyesteramide or polyester-co-polyesteramide chains thereof. Therefore, in one embodiment, the sum of the variables, m+n in the present invention is at least 3. For example, m+n may be from 3 to 65, for example, 5 to 50. In one embodiment of the invention, n may be any integer from 0 to 65. In another embodiment, n is any integer from 1 to 65, for example, at least 2, 3, 4, or further for example, 5 to 50. In still another embodiment, n is 0. The variable m may be any integer from 0 to 35. In one embodiment, m may be any integer from 1 to 35, for example, at least 2, 3, 4, or further for example, 5 to 16. In another embodiment, m is 0.

In embodiments of Formula I that contain a polyether segment (ie where n is 1 or more), $R^1$ may be H, methyl, or ethyl groups. The polyether segment is derived from the ring opening reaction of alkylene oxides, such as ethylene oxide, propylene oxide, butylene oxide, or mixtures thereof. In one embodiment of the invention, n may be any integer from 0 to 65. In another embodiment, n is any integer from 1 to 65, for example, at least 2, 3, 4, or further for example, 5 to 30. In still another embodiment, n is 0. The polyether segment can be synthesized by any method known to those skilled in the art, including but not limited to polymerization of alkylene oxides in the presence of mono alcohols or secondary amines to initiate the polyether chain extension. The polymerization can be conveniently performed in the presence of base catalysts such as potassium or sodium hydroxide at a temperature of 50° C. to 150° C. or 70° C. to 140° C. preferably under pressure to prevent loss of volatile alkylene oxides. In one embodiment, polyether mono alcohol compounds of Formula II where n is 3 or more, and b and m are both zero, are commercially available. Examples include but are not limited to polypropyleneglycol monobutyl ethers, poly(ethyleneglycol-ran-propyleneglycol) monobutyl ethers or polyethylene glycol mono methyl ethers of various molecular weights from Aldrich or under the tradename Synalox from Dow or Polyglykol from Clariant. Specific examples of Synalox™ are 100-D20, 100-40B, 100-50B, 100-D95 and 100-150B. Specific examples of Polyglykol™ are B01/20, B01/40, B01/80, B01/120 and B01/240. Polypropyleneglycol monoisotridecylether ether is available under the Polyglykol™ tradename from Clariant, a specific example is T01/35. Other mono-substituted alk(en)yl ethers, cycloalkyl ethers or aryl ethers of polyetheyleneoxide are also available from a variety of sources such as Sigma-Aldrich, Croda, Clariant, BASF, Dow and Ineos.

In embodiments of Formula I, the variable b is 0 or 1, with the proviso that b can only be 1 when both n and m are at least 1. In one embodiment, b is 1 and the sum of the variables, m+n is at least 4. $R^5$ represents a linear or branched hydrocarbon chain containing up to 3 carbon atoms and $R^6$ represents hydrogen (H), a hydrocarbyl group having 1 to 22 carbon atoms, which may optionally contain ether, ester, tertiary amine or amide functional groups. In one embodiment, $R^6$ may be derived from alkyl (meth)acrylate or (meth)acrylamide. In one embodiment, $R^6$ comprises the residue of an alkyl (meth)acrylate, or mixtures thereof. In one embodiment $R^6$ is an alkyl acrylate, and in another embodiment $R^6$ is an alkyl methacrylate. In one embodiment $R^6$ is an alkyl acrylamide, and in another embodiment $R^6$ is an alkyl methacrylamide. In one embodiment, $R^6$ is H. Examples of a suitable alkyl (meth)acrylate or (meth)acrylamide include those (meth)acrylate or (meth)acrylamide compounds wherein the alkyl group is methyl, ethyl, propyl, iso-propyl, butyl, pentyl, hexyl, heptyl, octyl, 2-ethylhexyl, nonyl, decyl, dodecyl, tetradecyl, hexadecyl, octadecyl, eicosyl, 2-dimethylaminoethyl, 3-dimethylaminopropyl or mixtures thereof. As used herein, the expression (meth)acrylate or (meth)acrylamide includes acrylate or methacrylate or mixtures thereof or acrylamide or methacrylamide or mixtures thereof.

In some embodiments of Formula I that contain both a polyether segment (ie where n is 1 or more) and a polyester or polyesteramide segment or a mixture thereof (ie where m is 1 or more) and b is 0, the polyether segment may be derived from the ring opening reaction of alkylene oxides in the presence of mono alcohols or secondary amines to initiate the polyether chain extension or from the commercially available polyether mono alcohols disclosed earlier.

In other embodiments of Formula I that contain both a polyether segment (ie where n is 1 or more) and a polyester or polyesteramide segment or a mixture thereof (ie where m is 1 or more) and b is 1, the residue of polymer Formula II, namely X-$(CH_2CHR^1-O)_n$—$[R^5-N(R^6)]_b$— may comprise a polyetheramine, for example, polyalkyleneoxide monoalkyl or aryl ether monoamine. This polyetheramine may be synthesized by any method known to those skilled in the art, including, but not limited to the ring opening reaction of alkylene oxides, such as ethylene oxide, propylene oxide, or butylene oxide or mixtures thereof in the presence of a mono-alcohol initiator to form an alcohol-ended polyether chain, followed by conversion of the alcohol-ended polyether chain to an amine using known amination reaction conditions such as ammonia in the presence of a metal catalyst such as those described in U.S. Pat. Nos. 3,654,370, 4,618,717, 4,960,942 and 5,457,147. In one embodiment, the polyetheramine may be obtained by alkoxylation of aminoalcohols as is described in U.S. Pat. No. 5,879,445 (in particular the disclosure in column 2, line 50 to column 7, line 50). In another embodiment, the polyetheramine may be obtained by base catalysed addition of an alcohol-ended polyether chain to acrylonitrile and subsequent hydrogenation to give an amine-ended polyether chain. Polyetheramines are commercially available under the tradenames Jeffamine™ M-series or Surfonamine™ B and L series of monoamines from Huntsman Corporation. Specific examples of Jeffamine™ amines are M-600 (9,1,600), M-1000 (3,19,1000), M-2005 (29,6,2000), M2095 (4,41,2000) and M-2070 (10,31,2000). Specific examples of Surfonamine™ amines are B-60 (9,1,600), L-100 (3,19,1000), B-200 (29,6,2000), B100 (12.5,0,1000), L200 (4,41,2000), L207 (10,31,2000) and L300 (8,58,3000). The figures in parentheses are approximate repeat units of propylene oxide, ethylene oxide and number-average molecular weight respectively. Commercially available polyetheramines, such as those listed here, may be incorporated into the alcohol terminated polymer of Formula II by means understood to those skilled in the art.

In embodiments of Formula I that contain a polyester segment (ie where m is 1 or more), $R^2$ may be a branched or linear, saturated or unsaturated hydrocarbon chain containing 1 to 10 carbon atoms, for example, 2 to 7 carbon atoms, or —$R^8$(C=O)$YR^9$— where Y is oxygen, and $R^8$ is a branched or linear, saturated or unsaturated hydrocarbon chain containing 1 to 10 carbon atoms, and $R^9$ is a branched or linear, saturated or unsaturated hydrocarbon chain containing 2 to 10 carbon atoms, and which may also include heteroatoms, such as oxygen present as ether groups. The variable m may be any integer from 0 to 35. In one embodiment, m may be any integer from 1 to 35, for example, at least 2, 3, 4, or further for example, 5 to 16. In another embodiment, m is 0. The polyester segment can be synthesized by any method known to those skilled in the art, including but not limited to (i) polymerization of lactones and/or hydroxycarboxylic acids in the presence of mono alcohols or amines to initiate the polyester chain extension or (ii) polymerization reaction of a diol with a dibasic acid or derivatives thereof such as acid chlorides, anhydride or dialkylesters in the presence of a stoichiometric amount of mono alcohols or amines to control molecular weight and suppress formation of dicarboxylic polyesters; and can be conveniently performed at a temperature of 50° C. to 250° C. or 70° C. to 200° C., optionally in the presence of an esterification catalyst and in an inert atmosphere. The inert atmosphere may be provided by any inert gas of the Periodic Table but is preferably nitrogen. The esterification catalyst may be any previously known to the art and include but not limited to tetra-alkyl titanate, for example, tetrabutyltitanate, zinc salt of an organic acid, for example zinc acetate, zirconium salt of an aliphatic alcohol for example zirconium isopropoxide or zirconium butoxide, methanesulphonic acid, toluene sulphonic acid, phosphoric acid, diphenyl phosphate, or a strong organic acid such as trifluoroacetic acid.

In another embodiment, the synthesis of the polyester segment can be accomplished by any methods known or hereafter developed without departing from the scope of the invention. For example, the polyester segment may be synthesized by polymerization of hydroxycarboxylic acids and/or lactones in the presence of mono alcohols or amines to initiate the polyester chain extension. The raw materials used may also include those now known or hereafter developed. Specific examples of suitable hydroxy carboxylic acids are glycolic acid and lactic acid including their cyclic dimers, glycolide and lactide, 6-hydroxy caproic acid, 5-hydroxy valeric acid, 5-hydroxy decanoic acid, 10-hydroxy undecanoic acid and 4-hydroxy decanoic acid or mixtures thereof. Examples of the lactones include C1-4 alkyl substituted ε-caprolactone or optionally substituted C1-4 alkyl δ-valerolactone and β-propiolactone or mixtures thereof.

The alkyl substituent in ε-caprolactone and δ-valerolactone may be C1-4-alkyl and may be linear or branched. Examples of suitable lactones are ε-caprolactone and the 7-methyl-, 2-methyl-, 3-methyl-, 5-methyl-, 6-methyl-, 4-methyl-, 5-tert-butyl-, 4,4,6-trimethyl- and 4,6,6-trimethyl-analogues and δ-valerolactone and the β-methyl-δ-valerolactone analogue thereof.

In another embodiment, the polyester segment may be synthesized by polymerization reaction of a diol with a dibasic acid or derivatives thereof such as acid chlorides, anhydride or dialkylesters in the presence of a stoichiometric amount of mono alcohols or amines to control molecular weight and suppress formation of dicarboxylic polyesters. Specific examples of suitable diols which result in the $R^9$ hydrocarbon chain described above include alkylene glycols such as ethylene glycol, propylene glycol, neopentyl glycol, 1,4-butanediol, 1,6-hexanediol, cis and trans 1,2- and 1,4-cyclohexanedimethanol, diols with ether linkages such as diethylene glycol, dipropylene glycol, tripropylene glycol and triethylene glycol, polyalkylene glycols such as polyethylene glycols, polypropylene glycols, polybutylene glycols, mixed block and random copolymers of polyethylene glycol and polypropylene glycol (Pluronic™ and reverse Pluronic™ ex BASF) with number average molecular weight (MW) less than 1000. Specific examples of suitable dibasic acids, diesters and anhydrides which result in the $R^8$ hydrocarbon chain described above include maleic anhydride, succinic anhydride, glutaric acid, fumaric acid, malonic acid, adipic acid, sebacic acid, phthalic anhydride, pimelic acid, dimer fatty acids and their hydrogenated versions, and cyclohexane dicarboxylic anhydride. Specific examples of alcohols and amines used to initiate the polymerisation of the polyester segment are disclosed earlier.

In embodiments of Formula I that contain a polyesteramide segment (ie where m is 1 or more), $R^2$ may be a hydrocarbon chain containing 2 to 15 carbon atoms including an amide functional group —N($R^{11}$)—(C=O)— where $R^{11}$ is H or a hydrocarbon chain containing 1 to 4 carbon atoms, or $R^2$ may be —$R^8$(C=O)$YR^9$— where Y is nitrogen, and $R^8$ is a branched or linear, saturated or unsaturated hydrocarbon chain containing 1 to 10 carbon atoms, and $R^9$ is a branched or linear, saturated or unsaturated hydrocarbon chain containing 2 to 10 carbon atoms, and which may also include heteroatoms, such as oxygen present as ether groups. The variable m may be any integer from 0 to 35. In one embodiment, m may be any integer from 1 to 35, for example, at least 2, 3, 4, or further for example, 5 to 16. In another embodiment, m is 0. The polyesteramide segment can be synthesized by any method known to those skilled in the art, including but not limited to (i) polymerization of lactones with aminocarboxylic acids in the presence of mono alcohols or amines to initiate the polyesteramide chain extension or (ii) polymerization reaction of an aminoalcohol with a dibasic acid or derivatives thereof such as acid chlorides, anhydride or dialkylesters in the presence of a stoichiometric amount of mono alcohols or amines to control molecular weight and suppress formation of dicarboxylic polyesters.

In another embodiment, the synthesis of the polyesteramide segment can be accomplished by any methods known or hereafter developed without departing from the scope of the invention. For example, the polyesteramide segment may be synthesized by polymerization of lactones with aminocarboxylic acids in the presence of mono alcohols or amines to initiate the polyesteramide chain extension and can be conveniently performed at a temperature of 50° C. to 250° C. or 70° C. to 200° C., optionally in the presence of an esterification catalyst and in an inert atmosphere. The inert atmosphere and esterification catalyst may be any previously known to the art and include but not limited to those disclosed earlier. The raw materials used may also include those now known or hereafter developed. Specific examples of suitable aminocarboxylic acids (or amino-acid) include 11-amino undecanoic acid, 12-amino dodecanoic acid, 6-amino caproic acid, 4-aminobutyric acid, β-alanine, glycine, and sarcosine. Mixtures of amino carboxylic acids may be used. Specific examples of suitable lactones, alcohols and amines are disclosed earlier.

In another embodiment, the synthesis of the polyesteramide segment can be accomplished by polymerization reaction of an aminoalcohol with a dibasic acid or derivatives thereof such as acid chlorides, anhydride or dialkylesters in the presence of a stoichiometric amount of mono alcohols or amines to control molecular weight and suppress formation of dicarboxylic polyesters. The aminoalcohol may be a C2-10-aminoalcohol and may also include heteroatoms, such as oxygen present as ether groups. Specific examples of suitable aminoalcohols include ethanolamine, 3-amino-1-propanol, 4-aminobutanol, 2-aminobutanol, 2-amino-2-methyl-1-propanol, 5-amino-1-pentanol, 5-amino-2-pentanol, 2-amino-3-methyl-1-butanol, 6-amino-1-hexanol, 2-amino-1-hexanol, serinol, 4-amino cyclohexanol, 2-(2-aminoethoxy)ethanol, or mixtures thereof. Specific examples of suitable dibasic acids, diesters and anhydrides, alcohols and amines are disclosed earlier.

In Formula I, $R^3$ comprises a branched or linear, saturated or unsaturated, hydrocarbon chain containing 2 to 80 carbon atoms. In one embodiment, $R^3$ is a linear saturated carbon chain containing 20 carbons. In another embodiment, $R^3$ is derived from a cyclic anhydride.

In Formula I, the variables q and t are each at least 1, so that each dispersant molecule contains a mixture of both salt and amide linkages. In one embodiment q+t is any integer from 2 to 200, for example, 2 to 150, where q is greater than or equal to t.

In Formula I, MA represents a multi-amine species. In one embodiment, the multi-amine species used in the present invention may have a number average molecular weight (MW) measured by ebullioscopic method analysis of between 300 and 20,000 g/mole, for example, 300 to 10,000 g/mol. In another embodiment, MA includes at least four amines. In one embodiment, MA is a polyamine and is selected from polyethyleneimine, modified polyethyleneimine, polyallylamine, modified polyallylamine, polyvinylamine, modified polyvinylamine or mixtures thereof. In one embodiment, at least 70, 80, 90 or 95 weight percent of the multi-amine species is polyethyleneimine.

The MA may be linear or branched. Linear polyethyleneimines may be prepared by hydrolysis of poly (N-acyl) alkyleneimines as described, for example, by Takeo Saegusa et al in Macromolecules, 1972, Vol. 5, page 4470. The branched polyethyleneimines of differing molecular weights are commercially available from BASF and Nihon Shokubai. Polyallylamine and poly-(N-alkyl) allylamines of differing molecular weights are commercially available from Nitto Boseki. Polyvinylamine of differing molecular weights are available from Mitsubishi Kasai. Poly(propyleneimine) dendrimers are commercially available from DSM Fine Chemicals and poly(amidoamine) dendrimers are available as "Starburst" dendrimers from Aldrich Chemical Co. In one embodiment, MA is poly(C2-6-alkyleneimine) and/or polyethylene imine.

In another embodiment, MA may be modified by reacting a portion of its primary and/or secondary amino groups with esters such as ethyl or butyl acetate, isocyanates such as phenyl isocyanate, lactones such as ε-caprolactone and δ-valerolactone, anhydrides such as succinic, maleic, phthalic, isatoic, 1,2-naphthalic anhydride, 1,8-naphthalic anhydride or 1,2,4-benzenetricarboxylic acid anhydride, cyclic carbonates such as ethylene carbonate, (meth)acrylates such as ethyl acrylate, or 2-hydroxyethyl acrylate, or epoxides, such as phenyl glycidyl ether, while ensuring there are still primary and/or secondary amino groups of the modified polyamine that are unmodified and hence still in the amine form.

In another embodiment, MA may be polyethylenimine. The polyethylenimine may be modified by substituting one or more protons of the NH units by a C2-4 alkyleneoxy unit. Polyethyleneimine can be modified by alkoxylation using a C2-4 alkylene oxide such as ethylene oxide, propylene oxide, butylene oxide or mixtures thereof. Examples of alkoxylated polyethyleneimines are commercially available from BASF and Nihon Shokubai. In this embodiment, the so-modified MA will still contain primary and/or secondary amino groups that are unmodified and still in amine form in order to form the dispersant polymers described herein.

Modification of the MA may be conducted under reaction conditions that are commonly understood by those skilled in the art, whether now existing or hereafter developed. It will be understood that modification of the MA prior to addition of the chains to create dispersant can be conducted under reaction conditions (such as higher temperature) that may not be viable after the dispersant molecule is formed.

In Formula I, $H^+$ represents a proton species generated when the anhydrides are reacted with the multi amine MA to generate an amide linkage and a salt linkage. The H+ species is attached to one of the nitrogen atoms of an amine group of MA to generate an ammonium cation. In one embodiment, the number of $H^+$ species is equal to the sum of q+p so that, overall, the dispersant molecule of Formula I has no charge.

In Formula I, the variables p and z can be 0, or 1 or more. In one embodiment, p+z is any integer from 1 to 200. In another embodiment, p+z is any integer from 2 to 200.

In Formula I, $R^4$ may be a linear or branched saturated carbon chain containing 1 to 4 carbon atoms, for example, 1 or 2. In one embodiment, R4 is derived from a non-cyclic anhydride.

The dispersant of the present invention (e.g. Formula I) is made using a novel process comprising the following steps: (a) providing an alcohol terminated polymer of the formula X-$(CH_2CHR^1$—$O)_n$—$[R^5$—$N(R^6)]_b$—$[(C=O)R^2$—$O]_m$—H (Formula II), (b) reacting the alcohol ended polymer with a cyclic anhydride to provide an acid terminated polymer, (c) reacting the acid terminated polymer with a non-cyclic anhydride to provide a mixture of anhydrides, and (d) reacting the mixture of anhydrides with a multi-amine species, wherein the multi-amine species has a number average molecular weight of 300 to 20,000 to form a dispersant molecule, wherein q and t are each at least one such that the dispersant contains both amide and salt linkages. In Formula II, X represents either R-Q or a cyclic secondary amine. When X is R-Q, R is a branched or linear, saturated or unsaturated, or cyclic hydrocarbon chain containing 1 to 50 carbon atoms, Q is O, or $NR^7$, or NH, with the proviso that Q can only be NH when n is 0 and b is 0, and $R^7$ is a linear or branched, saturated or unsaturated hydrocarbon chain containing between 1 and 18 carbon atoms, which may optionally contain ether, ester, or amide functional groups or a halide substituent. X may also be a cyclic amine structure derived from one or more cyclic secondary amines. In Formula II, $R^1$ is H, methyl, or ethyl, $R^5$ is a linear or branched hydrocarbon chain containing up to 3 carbon atoms; $R^6$ is hydrogen, a hydrocarbyl group containing 1 to 22 carbon atoms, or the residue of an alkyl (meth)acrylate or (meth) acrylamide. The variable b is 0 or 1, with the proviso that b can only be 1 when both n and m are both at least 1. $R^2$ is a linear or branched, saturated or unsaturated, hydrocarbon chain containing 1 to 15 carbon atoms or —$R^8(C=O)YR^9$—, where Y is O or NH or $NR^{10}$, $R^8$ is a hydrocarbon chain containing 1 to 10 carbon atoms, $R^9$ is a hydrocarbon chain containing 1 to 10 carbon atoms, and $R^{10}$ is a hydrocarbon chain containing 1 to 20 carbon atoms, which may include an ester, ether, or amide group. When $R^2$ is a hydrocarbon chain containing 1 to 15 carbon atoms, $R^2$ may be, in one embodiment, a linear or branched, saturated or unsaturated, hydrocarbon chain containing 1 to 10 carbon atoms, for example 2 to 7, and in another embodiment, $R^2$ may be a hydrocarbon chain containing 2 to 15 carbon atoms which includes an amide functional group having the formula, —$N(R^{11})$—$(C=O)$—, where $R^{11}$ is H or a hydrocarbon chain containing 1 to 4 carbon atoms. In Formula II, n is any integer from 0 to 65 and m is any integer from 0 to 35, with the proviso that m+n is at least 3.

In one embodiment, the alcohol ended polymer has a number average molecular weight of 300 to 5000 g/mol, for example, 500 to 3000 g/mol.

In one embodiment, the alcohol ended polymer and the cyclic anhydride are combined in approximately a 1:1 molar ratio and reacted at a temperature sufficiently high to solubilize the cyclic anhydride. For example, in one embodiment, temperatures around 130° C. may be suitable. In one embodiment, the reaction can take place over 2 to 48 hours and can be conveniently performed at a temperature of 50 to 150° C. or 70 to 140° C. under an inert atmosphere, optionally in the presence of a catalyst such as phosphoric acid. Examples of suitable cyclic anhydrides include, for example, glutaric anhydride, 1,2-cyclohexanedicarboxylic anhydride, homophthalic anhydride, succinic anhydride, diglycolic anhydride, polyisobutylene succinic anhydride, 2-phenylsuccinic anhydride, or alk(en)yl succinic anhydride.

The subsequent acid ended polymer is then reacted with a non-cyclic anhydride. Suitable non-cyclic anhydrides include butyric anhydride, isobutyric anhydride, propionic anhydride and acetic anhydride or mixtures thereof. In one embodiment, this reaction provides a mixture of hetero and homo anhydride products, where the hetero anhydrides are anhydrides where one half is from the polymer and the other is from the non-cyclic anhydride, and where the homo anhydrides are either an anhydride where both halves are made from the polymer or residual non-cyclic anhydride. In one embodiment, the acid ended polymer and the non-cyclic anhydride are combined in a molar ratio between 1:0.5 and 1:2.

The above reaction step is done using a setup to allow excess anhydride and acid byproduct to be removed from the reaction vessel. In one embodiment, this reaction is carried out for 2 to 10 hours at a reaction temperature that is above the boiling point of the acid generated but lower than the boiling point of the non-cyclic anhydride. For example, when acetic anhydride is used, a temperature of around 120° C. is suitable. Then, the reaction temperature is raised to a temperature above the boiling point of the non-cyclic anhydride (for example around 150° C. when acetic anhydride is used) and the reaction carried out for another 1 to 72 hours. The reactions described here may be done at atmospheric pressure. It should be understood to those skilled in the art that the reaction can be carried out at reduced pressure, such as under vacuum, which could reduce both the reaction temperature and reaction time.

The resulting mixture of anhydrides is then reacted with a multi-amine species as described herein. The mixture of anhydrides and the multi-amine component are combined in a weight ratio between 1:1 to 25:1, for example, 3:1 to 18:1. This reaction is conducted at a temperature less than 100° C. preferably less than 80° C. for ¼ to 6 hours under an inert atmosphere.

The process for making the dispersant of the present invention including the steps of (a) providing an alcohol terminated polymer of the formula X-$(CH_2CHR^1$—$O)_n$—$[R^5$—$N(R^6)]_b$—$[(C=O)R^2$—$O]_m$—H (Formula II), (b) reacting the alcohol ended polymer with a cyclic anhydride to provide an acid terminated polymer, (c) reacting the acid terminated polymer with a non-cyclic anhydride to provide a mixture of anhydrides, and (d) reacting the mixture of anhydrides with a multi-amine species, wherein the multi-amine species has a number average molecular weight of 300 to 20,000 to form a dispersant molecule having Formula I:

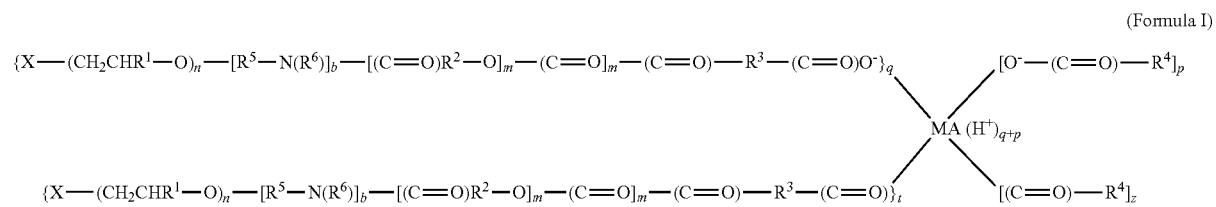

(Formula I)

The process includes making the dispersant having Formula I wherein X is R-Q or a cyclic amine, where when X is R-Q, R is a branched or linear, saturated or unsaturated, alkyl, aryl, aralkyl, or alkylaryl hydrocarbon chain, optionally substituted with halogens such as Cl and F or with heteroatoms such as N and O present as tertiary amine groups or ether groups and Q is O, or $NR^7$, or NH, with the proviso that Q can only be NH when n is 0 and b is 0. X may alternatively be a cyclic secondary amine, derived from amines such as piperidine, morpholine, 4-methylpiperidine, 4-phenylpiperidine, thiomorpholine, azetidine, 1-methylpiperazine, 2-methylpiperazine, and pyrrolidine including mixtures thereof. $R^1$ is H, methyl, or ethyl. $R^5$ is a linear or branched hydrocarbon chain containing up to 3 carbon atoms. $R^6$ is hydrogen, a hydrocarbyl group containing 1 to 22 carbon atoms, or the residue of an alkyl (meth)acrylate or (meth) acrylamide. b is 0 or 1, with the proviso that b can only be 1 when both n and m are both at least 1. $R^2$ is a linear or branched, saturated or unsaturated, hydrocarbon chain containing 1 to 15 carbon atoms or —$R^8$(C=O)$YR^9$—, where Y is O or NH or $NR^{10}$, $R^8$ is a hydrocarbon chain containing 1 to 10 carbon atoms, $R^9$ is a hydrocarbon chain containing 1 to 10 carbon atoms, and $R^{10}$ is a hydrocarbon chain containing 1 to 20 carbon atoms, which may include an ester, ether, or amide group. When $R^2$ is a hydrocarbon chain containing 1 to 15 carbon atoms, $R^2$ may be, in one embodiment, a linear or branched, saturated or unsaturated, hydrocarbon chain containing 1 to 10 carbon atoms, and in another embodiment, $R^2$ may be a hydrocarbon chain containing 2 to 15 carbon atoms which includes an amide functional group having the formula, —N($R^{11}$)—(C=O)—, where $R^{11}$ is H or a hydrocarbon chain containing 1 to 4 carbon atoms. The variable n is any integer from 0 to 65 and the variable m is any integer from 0 to 35, with the proviso that m+n is at least 3. $R^3$ is a linear or branched, saturated or unsaturated hydrocarbon containing between 2 and 80 carbons. The variables q and t are each at least 1, while q+t may be any integer from 2 to 150. MA is a multi-amine species having a number average molecular weight of 300 to 20,000 g/mol. p+z may be 0, or any integer from 1 or 2 to 200; $R^4$ is linear or branched, saturated carbon chain containing between 1 and 4 carbons, preferably between 1 and 3. In one embodiment, in Formula I, n is 0. In another embodiment, in Formula I, n is any integer from 3 to 65 and m is 0. In still another embodiment, in Formula I, m is 0. In another embodiment, in Formula I, m is any integer from 3 to 35, for example, 5 to 16, and n is 0. In another embodiment, in Formula I, both n and m are positive integers and n+m is 3 to 65, for example 5 to 30.

In one embodiment, the process of making a dispersant as disclosed above results in a dispersant of Formula I where n is 0 and m is at least 3. In another embodiment, the process of making a dispersant as disclosed above results in a dispersant of Formula I where m is 0 and n is at least 3. In another embodiment, the process of making a dispersant as disclosed above results in a dispersant of Formula I where either m or n is 0, but m+n is at least 3. In another embodiment, the process of making a dispersant as disclosed above results in a dispersant of Formula I where m+n is any integer from 3 to 65, for example 5 to 30.

In one embodiment, the dispersant of the present invention can be further functionalized to adapt its properties and application performance to specific requirements. These modification reactions described below may be between the various reagents listed below and the amines of the polyamine species that have not already been reacted with the polyether and/or polyester and/or polyesteramide groups detailed above. The modification of any remaining amino groups may take place in any way which is known to a person skilled in the art. Such modifications are desirable when, for example, amino groups will react with a binder system into which a pigment dispersion or paste is incorporated and cause flocculation. Such modifications can be conducted under reaction conductions that are commonly understood by those skilled in the art, whether now existing or hereafter developed. For modifications of the amine made after the multi-amine (MA) species has been incorporated into the dispersant molecule as described herein, it should be understood that such modifications may be required to be made under controlled temperatures, for example, 100° C. or lower.

The stated modifications are advantageous embodiments of the present invention and can be realized by:
a) reaction of one or more of the remaining free primary and secondary amino groups of the polyamine species with isocyanates, lactones, anhydrides, epoxides, cyclic carbonates, or (meth)acrylates. Specific examples of suitable isocyanates include phenyl isocyanate. Specific examples of suitable lactones include caprolactone and valerolactone. Reaction of one or more of the remaining free primary and secondary amino groups of the polyamine species with anhydrides are disclosed in U.S. Pat. Nos. 6,878,799 and 7,767,750. Specific examples of suitable anhydrides include maleic anhydride, succinic anhydride, phthalic anhdride, tetrahydrophthalic anhydride, methyltetrahydrophthalic anhydride, hexahydrophthalic anhydride, methylhexahydrophthalic anhydride, 1,8-naphthalic anhydride, optionally substituted with nitro or halogen substituents such as Cl and Br, isatoic anhydride, trimellitic anhydride, $C_{1\text{-}20}$ alkenyl and alkyl succinic anhydrides. Reaction of one or more of the remaining free primary and secondary amino groups of the polyamine species with epoxides is disclosed in JP4031471. Specific examples of suitable epoxides include styrene oxide, propylene oxide and ethylene oxide. Specific examples of suitable cyclic carbonates include ethylene carbonate and 2,2-dimethyltrimethylene carbonate. Specific examples of suitable (meth) acrylates includes ethyl acrylate and 2-hydroxyethyl acrylate;
b) salification and/or reaction of one or more of the remaining free primary, secondary or tertiary amino groups of the polyamine species with mono or polycarboxylic acids, mineral acids, phosphorus and polyoxometallate containing acids or strong acids. Suitable reagents for this purpose include hydrochloric acid, acetic acid, sulphuric acid, alkyl sulphonic acids, alkyl hydrogen sulphates or aryl sulphonic acids. Salification and/or reaction of one or more of the remaining free amino groups of the aminic polyamine species with mono or polycarboxylic acids or phosphorus containing acids are disclosed in JP9157374, US 2010/0017973 and US 2013/0126804. Specific examples of suitable mono carboxylic acids include optionally substituted C1-50 aliphatic monocarboxylic acids such as acetic acid, propionic acid, caproic acid, caprylic acid, 2-ethylhexanoic acid, nonanoic acid, decanoic acid, lauric acid, myristic acid, palmitic acid, oleic acid, linoleic acid, stearic acid, arachidic acid, erucic acid, behenic acid, methoxyacetic acid, mixtures of fatty acids derived from oils from naturally occurring sources such as sunflower oil, rape seed oil, castor oil and olive oil, branched alkyl carboxylic acids available under the trademark Isocarb™ (ex Sasol), Unicid™ acids which are linear C25-50 synthetic primary acids commercially available from Baker Hughes and aromatic carboxylic acids such as benzoic acid, salicylic acid and naphthoic acid. Specific examples of suitable polycarboxylic acids include succinic acid, malonic acid, adipic acid, sebacic acid, malic acid, fumaric acid, citric acid and tartaric acid. Specific examples of suitable phosphorus containing acids include phosphoric acid and phosphorous acid. Specific examples of suitable polyoxometallate containing acids include phosphomolybdic acid, phosphotungstic acid and silicomolybdic acid;
c) oxidation of one or more of the remaining free primary, secondary or tertiary amino groups of the polyamine species to nitrogen oxides;
d) quaternization of one or more of the remaining free tertiary amino groups of the polyamine species. This can be achieved using, alkyl sulfates, alkyl or aralkyl halides, halocarboxylic esters, alkyl oxalates or epoxides. Suitable reagents for this purpose include, dimethyl sulphate, benzyl chloride, methyl halides such as chlorine, bromine and iodine, dimethyl oxalate, ethylene oxide, propylene oxide and styrene oxide in the presence of acids, and propane (or butane) sultone; and e) reaction of one or more of the remaining free primary, secondary or tertiary amino groups of the polyamine species with one or more mono amino-reactive group terminated polymer(s) of MW 150-3000. Suitable examples of carboxylic acid terminated polyester, polyesteramide and polyamide polymers are disclosed in U.S. Pat. Nos. 4,224,212, 4,861,380, 5,700,395, 5,760, 257, 6,197,877, 8,202,935, JP4866255, JP8010601, JP9157361, WO 2006/113258 and WO 2007/039605. Suitable examples of carboxylic acid terminated polyether polymers are disclosed in JP4248207, U.S. Pat. Nos. 7,767,750, 7,671,119, 7,872,070, 8,076,409 and 8,168,713. Suitable examples of phosphate, sulphate and sulphonate terminated polyester polymers are disclosed in U.S. Pat. Nos. 4,861,380 and 6,197, 877. Suitable examples of (meth)acrylate terminated polyester, polyesteramide and polyamide polymers are disclosed in EP713894, JP3488001, JP2010-222522 and U.S. Pat. No. 8,202,935. Suitable examples of (meth)acrylate terminated polyether polymers are disclosed in U.S. Pat. No. 7,923,474 and JP2010-222522. Suitable examples of phosphate, sulphate and sulphonate terminated polyether, polyether/polyester, polyether/polyurethane and polyether/polyester/polyurethane polymers are disclosed in U.S. Pat. Nos. 5,130,463, 5,151,218, 6,111,054, 6,310,123, 7,595,416 and 8,202,935. Suitable examples of isocyanate terminated polyester and polyether polymers are disclosed in JP4031471, JP7149855 and WO 2007/039605. Suitable examples of epoxide or acetoacetoxy or cyclocarbonate terminated polyacrylate polymers are disclosed in U.S. Pat. No. 5,100,969.

One objective of the present invention is to provide compounds that are capable of improving the colour strength or other tinctorial properties, increasing a particulate solid load, and/or forming improved dispersions, having improved brightness of the final composition. This is achieved while also producing a composition with reduced viscosity, good dispersion stability, reduced particle size and reduced particle size distribution, reduced haze, improved gloss, and increased jetness (especially when the composition is black). The composition(s) of the present invention may also be stable under ambient storage, and high temperature storage conditions and also providing reduced discolouration/yellowing of final coatings.

The polymer of the invention herein is useful as a dispersant for various small particle dispersions such as suspendable pigments and particulates in various polar and non-polar media. The compositions of various particulates, the dispersant, and a continuous phase are useful as inks, coatings, paints, and millbases for coloring inks, coatings, and paints.

Industrial Application

The particulate solid present in the composition may be any inorganic or organic solid material which is substantially insoluble in the organic medium at the temperature concerned and which it is desired to stabilize in a finely divided form therein. The particulate solids may be in the form of a granular material, a fibre, a platelet or in the form of a powder, often a blown powder. In one embodiment, the particulate solid is a pigment.

The particulate solid (typically a pigment or filler) may have an average particle size measured by light scattering measurements of from 10 nanometers to 10 microns, or 10 nanometers to 1, 2, 3 or 5 microns, or 20 nanometers to 1, 2, 3 or 5 microns in diameter.

Examples of suitable solids are pigments for solvent inks; pigments, extenders, fillers, blowing agents and flame retardants for paints and plastic materials; dyes, especially disperse dyes; optical brightening agents and textile auxiliaries for solvent dyebaths; pigments for inks, toners and other solvent application systems; solids for oil-based and inverse-emulsion drilling muds; dirt and solid particles in dry cleaning fluids; metals; particulate ceramic materials and magnetic materials for ceramics, piezo ceramic printing, refractories, abrasives, foundry, capacitors, fuel cells, Ferro fluids, conductive inks, magnetic recording media, water treatment and hydrocarbon soil remediation; organic and inorganic monodisperse solids; metal, metal oxides and carbon for electrodes in batteries, fibers such as wood, paper, glass, steel, carbon and boron for composite materials; and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments." Examples of organic pigments are those from the azo, disazo, trisazo, condensed azo, azo lakes, naphthol pigments, anthanthrone, anthrapyrimidine, anthraquinone, benzimidazolone, carbazole, diketopyrrolopyrrole, flavanthrone, indigoid pigments, indanthrone, isodibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones, diketopyrrolopyrroles, perylenes and carbon blacks.

Examples of inorganic pigments include metallic oxides such as titanium dioxide, rutile titanium dioxide and surface coated titanium dioxide, titanium oxides of different colors such as yellow and black, iron oxides of different colors such as yellow, red, brown and black, zinc oxide, zirconium oxides, aluminium oxide, oxymetallic compounds such as bismuth vanadate, cobalt aluminate, cobalt stannate, cobalt zincate, zinc chromate and mixed metal oxides of two or more of manganese, nickel, titanium, chromium, antimony, magnesium, praseodymium, cobalt, iron or aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, ball clays including natural, synthetic and expandable, mica, talc including muscovites, phlogopites, lepidolites and chlorites, chalk, synthetic and precipitated silica, fumed silica, metal fibres and powders, zinc, aluminium, glass fibres, refractory fibres, carbon black including single- and multi-walled carbon nanotubes, reinforcing and non-reinforcing carbon black, graphite, Buckminsterfullerene, asphaltene, graphene, diamond, alumina, quartz, perlite, pegmatite, silica gel, wood flour, wood flake including soft and hard woods, saw dust, powdered paper/fibre, cellulosic fibres such as kenaf, hemp, sisal, flax, cotton, cotton linters, jute, ramie, rice husk or hulls, raffia, typha reed, coconut fibre, coir, oil palm fibre, kapok, banana leaf, caro, curaua, henequen leaf, harakeke leaf, abaca, sugar cane bagasse, straw, bamboo strips, wheat flour, MDF and the like, vermiculite, zeolites, hydrotalcites, fly ash from power plants, incinerated sewage sludge ash, pozzolanes, blast furnace slag, asbestos, chrysotile, anthophylite, crocidolite, wollastonite, attapulgite and the like, particulate ceramic materials such as alumina, zirconia, titania, ceria, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g. barium ferrites; and metal particles, for instance metallic aluminium, iron, nickel, cobalt, copper, silver, gold, palladium, and platinum and alloys thereof.

Other useful solid materials include flame retardants such as pentabromodiphenyl ether, octabromodiphenyl ether, decabromodiphenyl ether, hexabromocyclododecane, ammonium polyphosphate, melamine, melamine cyanurate, antimony oxide and borates; biocides or industrial microbial agents such as those mentioned in tables 2, 3, 4, 5, 6, 7, 8 and 9 of the chapter entitled "Industrial Microbial Agents" in Kirk-Othmer's Encyclopedia of Chemical Technology, Vol. 13, 1981, $3^{rd}$ Edition, and agrochemicals such as the fungicides flutriafen, carbendazim, chlorothalonil and mancozeb.

The organic medium present in the composition of the invention in one embodiment is a plastics material and in another embodiment an organic liquid. The organic liquid may be a non-polar or a polar organic liquid. By the term "polar," in relation to the organic liquid, it is meant that an organic liquid is capable of forming moderate to strong bonds as described in the article entitled "A Three Dimensional Approach to Solubility" by Crowley et al in Journal of Paint Technology, Vol. 38, 1966, page 269. Such organic liquids generally have a hydrogen bonding number of 5 or more as defined in the above-mentioned article.

Examples of suitable polar organic liquids are amines, ethers, especially lower alkyl ethers, organic acids, esters, ketones, glycols, glycol ethers, glycol esters, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol (also known as 2-methylpropanol), terpineol and dialkyl and cyclic ethers such as diethyl ether and tetrahydrofuran. In one embodiment, solvents are alkanols, alkane carboxylic acids and esters of alkane carboxylic acids. In one embodiment, the present invention is suitable for organic liquids that are substantially non-soluble in an aqueous medium. Furthermore, a person skilled in the art will appreciate that small quantities of an aqueous medium (such as glycols, glycol ethers, glycol esters and alcohols) may be present in the organic liquids provided the overall organic liquid is substantially non-soluble in an aqueous medium.

Examples of organic liquids, which may be used as polar organic liquids are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, medium oil alkyd, short oil alkyd, polyether polyols and multi-media resins such as acrylic and urea/aldehyde.

The organic liquid may be a polyol, that is to say, an organic liquid with two or more hydroxyl groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g. toluene and xylene), halogenated aromatic hydrocarbons (e.g. chlorobenzene, dichlorobenzene, chlorotoluene), non-halogenated aliphatic hydrocarbons (e.g. linear and branched aliphatic hydrocarbons containing six or more carbon atoms both fully and partially saturated), halogenated aliphatic hydrocarbons (e.g. dichloromethane, carbon tetrachloride, chloroform, trichloroethane) and natural non-polar organics (e.g. vegetable oil, sunflower oil, rapeseed oil, linseed oil, terpenes and glycerides).

In one embodiment, the organic liquid comprises at least 0.1% by weight, or 1% by weight or more of a polar organic liquid based on the total organic liquid. In one embodiment, the organic liquid is free of water.

The plastics material may be a thermosetting resin. The thermosetting resins useful in this invention include resins which undergo a chemical reaction when heated, catalyzed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, amino resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

In one embodiment, the thermosetting composite or thermosetting plastic may be a polyester, a polyvinyl acetate, a polyester resin in styrene, a polystyrene, or mixtures thereof.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and diphenylmethane diisocyanates.

If desired, the compositions of the present invention may contain other ingredients, for example resins (where these do not already constitute the organic medium), binders, co-solvents, cross-linking agents, fluidising agents, wetting agents, anti-sedimentation agents, plasticisers, surfactants, dispersants other than the compound of the present invention, humectants, anti-foamers, anti-cratering agents, rheology modifiers, heat stabilizers, light stabilizers, UV absorbers, antioxidants, leveling agents, gloss modifiers, biocides and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The compositions containing an organic liquid may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example by high speed mixing, ball milling, basket milling, bead milling, gravel milling, sand grinding, attrition grinding, two roll or three roll milling, plastic milling until the dispersion is formed. Alternatively, the solid may be treated to reduce its particle size independently or in admixture with either the organic medium or the dispersant, the other ingredient or ingredients then being added and the mixture being agitated to provide the composition. The composition can also be made by grinding or milling the dry solid with the dispersant and then adding the liquid medium or mixing the solid with the dispersant in a liquid medium in a pigment flushing process.

The composition of the present invention is particularly suited to liquid dispersions. In one embodiment, such dispersion compositions comprise:
a) from 0.5 to 80 parts of a particulate solid;
b) from 0.1 to 79.6 parts of a polymer/dispersant of Formula I; and
c) from 19.9 to 99.4 parts of an organic liquid.
wherein all relative parts are by weight and the amounts (a)+(b)+(c)=100.

In one embodiment, component a) comprises from 0.5 to 30 parts of a pigment and such dispersions are useful as (liquid) inks, paints and millbases.

If a composition is required comprising a particulate solid and a dispersant of Formula 1 in dry form, the organic liquid is typically volatile so that it may be readily removed from the particulate solid by a simple separation means such as evaporation. In one embodiment, the composition comprises the organic liquid.

If the dry composition consists essentially of the dispersant of formula (1) and the particulate solid, it typically contains at least 0.2%, at least 0.5% or at least 1.0% dispersant of Formula I based on weight of the particulate solid. In one embodiment, the dry composition contains not greater than 100%, not greater than 50%, not greater than 20% or not greater than 10% by weight of dispersant of Formula 1 based on the weight of the particulate solid.

As disclosed herein, the compositions of the invention are suitable for preparing millbases wherein the particulate solid is milled in an organic liquid in the presence of a compound for Formula 1.

Thus, according to a still further aspect of the invention, there is provided a millbase comprising a particulate solid, an organic liquid and a polymer of formula (1).

Typically, the millbase contains from 20 to 70% by weight particulate solid based on the total weight of the millbase. In one embodiment, the particulate solid is not less than 10 or not less than 20% by weight of the millbase. Such millbases may optionally contain a binder added either before or after milling.

In one embodiment, the binder is a polymeric material capable of binding the composition on volatilisation of the organic liquid.

Binders are polymeric materials including natural and synthetic materials. In one embodiment, binders include poly(meth)acrylates, polystyrenics, polyesters, polyurethanes, alkyds, polysaccharides such as cellulose, nitrocellulose, and natural proteins such as casein. The binder may be nitrocellulose. In one embodiment, the binder is present in the composition at more than 100% based on the amount of particulate solid, more than 200%, more than 300% or more than 400%.

The amount of optional binder in the millbase can vary over wide limits but is typically not less than 10%, and often not less than 20% by weight of the continuous/liquid phase of the millbase. In one embodiment, the amount of binder is not greater than 50% or not greater than 40% by weight of the continuous/liquid phase of the millbase.

The amount of dispersant in the millbase is dependent on the amount of particulate solid but is typically from 0.5 to 5% by weight of the millbase.

Dispersions and millbases made from the composition of the invention are particularly suitable for use in non-aqueous and solvent free formulations in which energy curable systems (ultra-violet, laser light, infra-red, cationic, electron beam, microwave) are employed with monomers, oligomers, etc. or a combination present in the formulation. They are particularly suitable for use in coatings such as paints, varnishes, inks, other coating materials and plastics. Suitable examples include their use in low, medium and high solids paints, general industrial paints including baking, two component and metal coating paints such as coil and can coatings, powder coatings, UV-curable coatings, wood varnishes; inks, such as flexographic, gravure, offset, lithographic, letterpress or relief, screen printing and printing inks for packaging printing, non-impact inks such as inkjet inks including continuous inkjet and drop on demand inkjet which include thermal, piezo and electrostatic, phase change inks and hot melt wax inks, inks for ink-jet printers and print varnishes such as overprint varnishes; polyol and plastisol dispersions; non-aqueous ceramic processes, especially tape-casting, gel-casting, doctor-blade, extrusion and injection moulding type processes, a further example would be in the preparation of dry ceramic powders for isostatic pressing; composites such as sheet moulding and bulk moulding compounds, resin transfer moulding, pultrusion, hand-lay-up and spray-lay-up processes, matched die moulding; construction materials like casting resins, cosmetics, personal care like nail coatings, sunscreens, adhesives, toners such as liquid toners, plastics materials and electronic materials such as coating formulations for color filter systems in displays including organic light-emitting diode (OLED) devices, liquid crystal displays and electrophoretic displays, glass coatings including optical fiber coatings, reflective coatings or anti-reflective coatings, conductive and magnetic inks and coatings. They are useful in the surface modification of pigments and fillers to improve the dispersibility of dry powders used in the above applications. Further examples of coating materials are given in Bodo Muller, Ulrich Poth, Lackformulierung und Lackrezeptur, Lehrbuch fr Ausbildung und Praxis, Vincentz Verlag, Hanover (2003) and in P. G. Garrat, Strahlenhartung, Vincentz Verlag, Hanover (1996). Examples of printing ink formulations are given in E. W. Flick, Printing Ink and Overprint Varnish Formulations—Recent Developments, Noyes Publications, Park Ridge NJ, (1990) and subsequent editions.

In one embodiment, the composition of the invention further includes one or more additional known dispersants.

The following examples provide illustrations of the invention. These examples are non exhaustive and are not intended to limit the scope of the invention.

Reagents Used

1-Dodecanol—from Sigma Aldrich
Isofol™-36—from Condea Chemie GmbH
ε-Caprolactone—from Perstorp
Diphenyl phosphate—from Sigma Aldrich
1-Butanol—from Fisher Scientific
mPEG 750—poly(ethylene glycol) methyl ether—from Sigma Aldrich, MW 750
Zirconium (IV) butoxide solution—from Sigma Aldrich, 80% wt in 1-butanol
mPEG 500—poly(ethylene glycol) methyl ether—from Sigma Aldrich, MW 500
δ-Valerolactone—from BASF
BuO PPG 1000—poly(propylene glycol) butyl ether—from Sigma Aldrich, MW 1000
L-Lactide—grade Puralact B3—from Corbion
Surfonamine™ B60—from Huntsman
Surfonamine L100—from Huntsman
Succinic anhydride—from Sigma Aldrich
Glutaric Anhydride—from TCI
Hexadecenyl succinic anhydride—from Vertellus
Octadecenyl succinic anhydride—from Vertellus
Homophthalic Anhydride—from Acros Organics
Toluene—from Fisher Scientific
mPEG 1000—poly(ethylene glycol) methyl ether—from Ineos, MW 1000
mPEG350—poly(ethylene glycol) methyl ether—from Sigma Aldrich Mw 350
Synalox™ 50-30B—poly(ethylene glycol-ran-propylene glycol) monobutyl ether MW 1000—from Dow,
Orthophosphoric acid solution—from Sigma Aldrich, 85% wt in water
Propoxylated alcohol 1-24 molar equivalents of propylene oxide initiated with a C12-C15 alcohol, MW 1600 from Lubrizol
Butoxylated alcohol 1-20 molar equivalents of butylene oxide initiated with a C12-C15 alcohol, MW 1700 from Lubrizol
Acetic anhydride—from Sigma Aldrich
Epomin™ SP200 polyethyleneimine—from Nippon Shokubai, MW 10000
Epomin™ SP018 polyethyleneimine—from Nippon Shokubai, MW 1800
Epomin™ SP006 polyethyleneimine—from Nippon Shokubai, MW 600
Adipic acid—from Sigma Aldrich
1,4-butandiol—from Sigma Aldrich
6-aminohexanoic acid—from Sigma Aldrich
Ortho-Phosphoric acid—from Sigma Aldrich
Dimethyl sulfate—from Sigma Aldrich
Polyisobutenyl succinic anhydride 550—from Lubrizol MW550

Step 1—Synthesis of Alcohol Ended Polymers

Alcohol-ended polymer 1: Charged 1-dodecanol (100.85 parts) and ε-caprolactone (802.98 parts) to a reaction vessel and heated to 70° C. under nitrogen. When at temperature, charged diphenyl phosphate (2.71 parts). After 4 hours, reaction stopped to yield a white waxy solid. This is Alcohol-ended polymer 1.

Alcohol-ended polymer 2: Charged ε-caprolactone (410.01 parts) to a reaction vessel and heated to 110° C. under nitrogen. After 1 hour, reduced the temperature to 70° C. Once at temperature, charged 1-butanol (88.75 parts) and diphenyl phosphate (1.50 parts). After 3 hours, reaction stopped to yield a clear colourless liquid. This is Alcohol-ended polymer 2.

Alcohol-ended polymer 3: Charged mPEG 750 (111.80 parts) and ε-caprolactone (141.23 parts) to a reaction vessel and heated to 120° C. under nitrogen. After 1½ hours charged zirconium butoxide solution (0.95 parts) and increased the temperature to 180° C. After 20 hours, reaction stopped to yield a yellow paste. This is Alcohol-ended polymer 3.

Alcohol-ended polymer 4: Charged mPEG 500 (60.00 parts), ε-caprolactone (46.62 parts), δ-valerolactone (48.10 parts), and L-lactide (51.89 parts) to a reaction vessel and heated to 120° C. under nitrogen. After 1½ hours charged zirconium butoxide solution (0.77 parts) and increased the temperature to 180° C. After 19 hours, reaction stopped to yield a clear brown liquid. This is Alcohol-ended polymer 4.

Alcohol-ended polymer 5: Charged BuO PPG 1000 (431.04 parts) and L-lactide (310.63 parts) to a reaction vessel and heated to 120° C. under nitrogen. After 1½ hours charged zirconium butoxide solution (2.23 parts) and increased the temperature to 180° C. After 19 hours, reaction stopped to yield a brown paste. This is Alcohol-ended polymer 5.

Alcohol-ended polymer 6: Charged mPEG 500 (65.02 parts), ε-caprolactone (81.61 parts), and δ-valerolactone (78.10 parts) to a reaction vessel and heated to 70° C. under nitrogen. Charged orthophosphoric acid solution (0.68 parts) and increased the temperature to 120° C. After 8 hours, reaction stopped to yield a clear colourless liquid. This is Alcohol-ended polymer 6.

Alcohol-ended polymer 7: Charged 1-dodecanol (25.41 parts), ε-caprolactone (70.00 parts), δ-valerolactone (68.22 parts), and L-lactide (68.75 parts) to a reaction vessel and heated to 120° C. under nitrogen. After 1½ hours charged zirconium butoxide solution (0.87 parts) and increased the temperature to 180° C. After 8 hours, reaction stopped to yield a hazy yellow liquid. This is Alcohol-ended polymer 7.

Alcohol-ended polymer 8: Charged Isofol™-36 (70.04 parts) and ε-caprolactone (152.81 parts) to a reaction vessel and heated to 70° C. under nitrogen. When reaction temperature reached 70° C. charged ortho-phosphoric acid (0.72 parts) and increased the temperature to 120° C. After 8 hours, reaction stopped to yield an off-white solid at room temperature. This is Alcohol-ended polymer 8.

Alcohol-ended polymer 9: Surfonamine™ B60 (60 parts), ε-caprolactone (99.4 parts) and ortho phosphoric acid (0.1 g) were added to a reaction vessel and stirred at 120 C for hours under a nitrogen atmosphere. A pale yellow liquid (157 parts) was obtained. This is alcohol ended polymer 9.

Alcohol-ended polymer 10: Charged Surfonamine™ L100 (60 parts) and ε-caprolactone (12.8 parts) to a reaction vessel and heated to 120° C. with stirring under nitrogen. Charged o-phosphoric acid (0.1 parts) and stirred at 120° C. for 8 hours. Reaction stopped to yield a pale yellow paste. This is Alcohol-ended polymer 10.

Alcohol-ended polymer 11: Charged mPEG350 (100 parts), ε-caprolactone (63.6 parts), δ-valerolactone (38.6 parts) and o-phosphoric acid (0.2 parts) to a reaction vessel and heated to 120° C. with stirring under a nitrogen atmosphere for 16 hours. Reaction stopped to yield a colourless liquid. This is Alcohol-ended polymer 11.

Alcohol-ended Polymer 12: The procedure of Agent J in U.S. Pat. No. 4,518,435 was repeated to make a polyether adduct prepared by condensing 2-diethylaminoethanol with 10 moles of ethylene oxide followed by 20 moles of propylene oxide. This is Alcohol ended Polymer 12.

Alcohol-ended polymer 13: Charged adipic acid (81.09 parts), decanol (12.56 parts) and 1,4-butanediol (150.15 parts) to a reaction vessel and heated to 130° C. with stirring under nitrogen. Charged o-phosphoric acid (0.42 parts) and stirred at 130° C. for 49.5 hours. Reaction stopped to yield a white solid. This is Alcohol-ended polymer 13.

Alcohol-ended polymer 14: Charged octylamine (11.32 parts) and ε-caprolactone (140 parts) to a reaction vessel and heated to 90° C. with stirring under nitrogen. After 3.5 hours the temperature was increased to 120° C., stirring for 30 mins. Charged zirconium butoxide (0.46 parts) and the temperature was raised to 180° C. The reaction was stirred at 180° C. for 18 hours. Reaction stopped to yield a white solid. This is Alcohol-ended polymer 14.

Alcohol-ended polymer 15: Charged a polyether form from 2-naphthol and 10 moles of ethylene oxide (69.42 parts) and ε-caprolactone (134.75 parts) to a reaction vessel and heated to 70° C. with stirring under nitrogen. Charged o-phosphoric acid (0.61 parts) and temperature increased to 120° C. The reaction was stirred at 120° C. for 18.5 hours. Reaction stopped to yield a cream waxy solid. This is Alcohol-ended polymer 15.

Alcohol-ended polymer 16: Charged 6-aminohexanoic acid (70.13 parts) and ε-caprolactone (127.02 parts) to a reaction vessel and heated to 180° C. with stirring under nitrogen for 1.5 hours. After this time the temperature was lowered to 120° C. for 0.75 hours. Decanol (20.77) was then added, and after 5 minutes zirconium butoxide (0.43 parts) was added. The temperature was raised to 180° C. and stirred for 17.5 hours at this temperature. Reaction stopped to yield a beige solid. This is Alcohol-ended polymer 16.

Step 2—Reaction of Alcohol Ended Polymer with Cyclic Anhydride to Generate Acid Ended Polymer Acid-ended polymer 1: Charged Alcohol-ended polymer 1 (843.81 parts) to a reaction vessel and heated to 70° C. under nitrogen. When at temperature, charged succinic anhydride (50.53 parts) and increased the temperature to 130° C. After 20 hours, reaction stopped to yield a white waxy solid with an acid value of 34 mg KOH/g. This is Acid-ended polymer 1.

Acid-ended polymer 2: Charged Alcohol-ended polymer 2 (450.00 parts) and toluene (22.37 parts) to a reaction vessel equipped with a condenser and heated to 70° C. under nitrogen. When at temperature, charged succinic anhydride (108.13 parts) and increased the temperature to 130° C. After 18 hours, reaction stopped and cooled to 60° C. Removed toluene using a rotary evaporator to yield a slightly hazy pale yellow liquid with an acid value of 116 mg KOH/g. This is Acid-ended polymer 2.

Acid-ended polymer 3: Charged Alcohol-ended polymer 3 (211.77 parts) to a reaction vessel and heated to 70° C. under nitrogen. When at temperature, charged succinic anhydride (12.46 parts) and increased the temperature to 130° C. After 7½ hours, reaction stopped to yield a pale yellow paste with an acid value of 34 mg KOH/g. This is Acid-ended polymer 3.

Acid-ended polymer 4: Charged Alcohol-ended polymer 4 (180.00 parts) to a reaction vessel and heated to 70° C. under nitrogen. When at temperature, charged succinic anhydride (10.44 parts) and increased the temperature to 130° C. After 12½ hours, reaction stopped to yield a clear brown liquid with an acid value of 44 mg KOH/g. This is Acid-ended polymer 4.

Acid-ended polymer 5: Charged Alcohol-ended polymer 5 (180.00 parts) to a reaction vessel and heated to 70° C. under nitrogen. When at temperature, charged succinic anhydride (10.52 parts) and increased the temperature to 130° C. After 31 hours, reaction stopped to yield a viscous amber liquid with an acid value of 34 mg KOH/g. This is Acid-ended polymer 5.

Acid-ended polymer 6: Charged mPEG 1000 (300.00 parts) to a reaction vessel and heated to 70° C. under nitrogen. When at temperature, charged succinic anhydride (30.01 parts) and increased the temperature to 130° C. After 5 hours, reaction stopped to yield a white waxy paste with an acid value of 54 mg KOH/g. This is Acid-ended polymer 6.

Acid-ended polymer 7: Charged BuO PPG 1000 (100.00 parts) to a reaction vessel and heated to 70° C. under nitrogen. When at temperature, charged succinic anhydride (10.04 parts) and increased the temperature to 130° C. After 18 hours, reaction stopped to yield a clear colourless liquid with an acid value of 45 mg KOH/g. This is Acid-ended polymer 7.

Acid-ended polymer 8: Charged Synalox™ 30-50B (245.03 parts) and orthophosphoric acid solution (0.97 parts)

to a reaction vessel and heated to 70° C. under nitrogen. When at temperature, charged succinic anhydride (24.52 parts) and increased the temperature to 130° C. After 9 hours, reaction stopped to yield a clear colourless liquid with an acid value of 61 mg KOH/g. This is Acid-ended polymer 8.

Acid-ended polymer 9: Charged Propoxylated alcohol 1 (300.00 parts) to a reaction vessel and heated to 70° C. under nitrogen. When at temperature, charged succinic anhydride (18.76 parts) and increased the temperature to 130° C. After 26 hours, reaction stopped to yield a clear yellow liquid with an acid value of 36 mg KOH/g. This is Acid-ended polymer 9.

Acid-ended polymer 10: Charged Alcohol-ended polymer 6 (200.00 parts) to a reaction vessel and heated to 70° C. under nitrogen. When at temperature, charged succinic anhydride (11.57 parts) and increased the temperature to 130° C. After 4½ hours, reaction stopped to yield a clear colourless liquid with an acid value of 42 mg KOH/g. This is Acid-ended polymer 10.

Acid-ended polymer 11: Charged Alcohol-ended polymer 7 (200.00 parts) to a reaction vessel and heated to 70° C. under nitrogen. When at temperature, charged succinic anhydride (11.74 parts) and increased the temperature to 130° C. After 16 hours, reaction stopped to yield a hazy yellow liquid with an acid value of 41 mg KOH/g. This is Acid-ended polymer 11.

Acid-ended polymer 12: Charged Alcohol-ended polymer 8 (188.10 parts) to a reaction vessel and heated to 70° C. under nitrogen. When at temperature, charged succinic anhydride (11.40 parts) and increased the temperature to 130° C. After 8.5 hours, reaction stopped to yield a off-white solid at room temperature with an acid value of 40 mg KOH/g. This is Acid-ended polymer 12.

Acid-ended polymer 13: Charged Alcohol-ended Propoxylated alcohol 1 (140.60 parts) to a reaction vessel and heated to 70° C. under nitrogen. When at temperature, charged glutaric anhydride (9.40 parts) and increased the temperature to 130° C. After 18 hours, reaction stopped to yield a clear liquid at room temperature with an acid value of 36.10 mg KOH/g. This is Acid-ended polymer 13.

Acid-ended polymer 14: Charged Alcohol-ended Propoxylated alcohol 1 (150.08 parts) to a reaction vessel and heated to 70° C. under nitrogen. When at temperature, charged a mixture of Hexadecenyl succinic anhydride and Octadecenyl succinic anhydride as equal weights (30.54 parts) and increased the temperature to 130° C. After 21.5 hours, reaction stopped to yield a pale yellow clear liquid at room temperature with an acid value of 41.09 mg KOH/g. This is Acid-ended polymer 14.

Acid-ended polymer 15: Charged Alcohol-ended Propoxylated alcohol 1 (119.98 parts) to a reaction vessel and heated to 70° C. under nitrogen. When at temperature, charged homophthalic anhydride (10.79 parts) and increased the temperature to 130° C. After 23 hours, reaction stopped to yield a clear liquid at room temperature with an acid value of 39.88 mg KOH/g. This is Acid-ended polymer 15.

Acid-ended polymer 16: Charged Alcohol-ended 9 (150.06 parts) to a reaction vessel and heated to 70° C. under nitrogen. When at temperature, charged succinic anhydride (9.12 parts) and increased the temperature to 130° C. After 4.5 hours, reaction stopped to yield a off-white wax at room temperature with an acid value of 46.45 mg KOH/g. This is Acid-ended polymer 16.

Acid-ended polymer 17: Charged Butoxylated alcohol 1 (283 parts) to a reaction vessel and heated to 70° C. with stirring under a nitrogen atmosphere. When at temperature, charged succinic anhydride (13.4 parts) and increased the temperature to 120° C. After 20 hours, reaction stopped to yield a colourless liquid with an acid value of 25.3 mg KOH/g. This is Acid-ended polymer 17.

Acid-ended polymer 18: Charged Alcohol-ended polymer 10 (72.8 parts) to a reaction vessel and heated to 80° C. under a nitrogen atmosphere. When at temperature, charged succinic anhydride (5.6 parts) and increased the temperature to 120° C. After 8 hours, reaction stopped to yield a pale yellow waxy solid with an acid value of 46.1 mg KOH/g. This is Acid-ended polymer 18.

Acid-ended polymer 19: Charged Alcohol-ended polymer 11 (202.2 parts) to a reaction vessel and heated to 80° C. under a nitrogen atmosphere. When at temperature, charged succinic anhydride (28.5 parts) and stirred 80° C. for 12 hours. Reaction stopped to yield a pale yellow liquid with an acid value of 72.3 mg KOH/g. This is Acid-ended polymer 19.

Acid-ended polymer 20: Charged Propoxylated alcohol 1 (200 parts) to a reaction vessel and heated to 70° C. under nitrogen. When at temperature, charged succinic anhydride (11.1 parts) and increased the temperature to 120° C. After 20 hours, reaction stopped to yield a colourless liquid with an acid value of 34 mg KOH/g. This is Acid-ended polymer 20.

Acid-ended polymer 21: Charged Alcohol-ended polymer 12 (153 parts) to a reaction vessel and heated to 70° C. under nitrogen. When at temperature, charged succinic anhydride (8.7 parts) and increased the temperature to 120° C. After 10 hours, reaction stopped to yield a pale yellow, hazy liquid with an acid value of 31.9 mg KOH/g. This is Acid-ended polymer 21.

Acid-ended polymer 22: Charged Propoxylated alcohol 1 (59.5 parts) and Polyisobutenyl succinic anhydride 550 (36.06 parts) to a reaction vessel and heated to 70° C. under nitrogen. When at temperature, charged o-phosphoric acid (0.84 parts) and increased the temperature to 130° C. After 50 hours, reaction stopped to yield a clear yellow liquid at room temperature with an acid value of 31.25 mg KOH/g. This is Acid-ended polymer 22.

Acid-ended polymer 23: Charged Alcohol-ended polymer 13 (55.1 parts) to a reaction vessel and heated to 70° C. under nitrogen. When at temperature, charged succinic anhydride (3.1 parts) and increased the temperature to 130° C. After 4.5 hours, reaction stopped to yield a white solid at room temperature with an acid value of 38.38 mg KOH/g. This is Acid-ended polymer 23.

Acid-ended polymer 24: Charged Alcohol-ended polymer 14 (140.13 parts) to a reaction vessel and heated to 70° C. under nitrogen. When at temperature, charged succinic anhydride (8.11 parts) and increased the temperature to 130° C. After 2.5 hours, reaction stopped to yield a clear liquid at room temperature with an acid value of 32.58 mg KOH/g. This is Acid-ended polymer 24.

Acid-ended polymer 25: Charged Alcohol-ended polymer 15 (185.04 parts) to a reaction vessel and heated to 70° C. under nitrogen. When at temperature, charged succinic anhydride (10.80 parts) and increased the temperature to 130° C. After 20 hours, reaction stopped to yield a cream solid at room temperature with an acid value of 35.74 mg KOH/g. This is Acid-ended polymer 25.

Acid-ended polymer 26: Charged Alcohol-ended polymer 16 (115.26 parts) to a reaction vessel and heated to 70° C. under nitrogen. When at temperature, charged succinic anhydride (7.04 parts) and increased the temperature to 130° C. After 3.75 hours, reaction stopped to yield a cream solid at room temperature with an acid value of 35.15 mg KOH/g. This is Acid-ended polymer 26.

Step 3—Reaction of Acid Ended Polymer with Non-Cyclic Anhydride to Generate Polymeric Anhydride Polymeric anhydride 1: Charged Acid-ended polymer 1 (420.00 parts) and acetic anhydride (30.94 parts) to a reaction vessel fitted with a Dean Stark trap and heated to 120° C. under nitrogen. After 6 hours, increased the temperature to 150° C. After a further 4 hours, reaction stopped to yield a white waxy solid. This is Polymeric anhydride 1.

Polymeric anhydride 2: Charged Acid-ended polymer 2 (120.00 parts) and acetic anhydride (30.30 parts) to a reaction vessel fitted with a Dean Stark trap and heated to 120° C. under nitrogen. After 6 hours, increased the temperature to 150° C. After a further 16 hours, removed the Dean Stark trap to leave an open port. After a further 1 hour, reaction stopped to yield a clear pale yellow liquid. This is Polymeric anhydride 2.

Polymeric anhydride 3: Charged Acid-ended polymer 3 (140.00 parts) and acetic anhydride (9.53 parts) to a reaction vessel fitted with a Dean Stark trap and heated to 120° C. under nitrogen. After 6 hours, increased the temperature to 150° C. After a further 18 hours, removed the Dean Stark trap to leave an open port. After a further 1 hour, reaction stopped to yield a pale brown paste. This is Polymeric anhydride 3.

Polymeric anhydride 4: Charged Acid-ended polymer 4 (99.99 parts) and acetic anhydride (6.73 parts) to a reaction vessel fitted with a Dean Stark trap and heated to 120° C. under nitrogen. After 6 hours, increased the temperature to 150° C. After a further 19 hours, removed the Dean Stark trap to leave an open port. After a further 1 hour, reaction stopped to yield a clear dark brown liquid. This is Polymeric anhydride 4.

Polymeric anhydride 5: Charged Acid-ended polymer 5 (99.97 parts) and acetic anhydride (6.73 parts) to a reaction vessel fitted with a Dean Stark trap and heated to 120° C. under nitrogen. After 6 hours, increased the temperature to 150° C. After a further 19 hours, reaction stopped to yield a viscous brown liquid. This is Polymeric anhydride 5.

Polymeric anhydride 6: Charged Acid-ended polymer 6 (90.00 parts) and acetic anhydride (10.02 parts) to a reaction vessel fitted with a Dean Stark trap and heated to 120° C. under nitrogen. After 6 hours, increased the temperature to 150° C. After a further 17½ hours, removed the Dean Stark trap to leave an open port. After a further 1 hour, reaction stopped to yield a dark brown waxy solid. This is Polymeric anhydride 6.

Polymeric anhydride 7: Charged Acid-ended polymer 7 (40.00 parts) and acetic anhydride (3.94 parts) to a reaction vessel fitted with a Dean Stark trap and heated to 120° C. under nitrogen. After 6 hours, increased the temperature to 150° C. After a further 16 hours, removed the Dean Stark trap to leave an open port. After a further 1 hour, reaction stopped to yield a clear pale yellow liquid. This is Polymeric anhydride 7.

Polymeric anhydride 8: Charged Acid-ended polymer 8 (150.00 parts) and acetic anhydride (16.71 parts) to a reaction vessel fitted with a Dean Stark trap and heated to 120° C. under nitrogen. After 6 hours, increased the temperature to 150° C. After a further 16 hours, removed the Dean Stark trap to leave an open port. After a further 1 hour, reaction stopped to yield a dark brown liquid. This is Polymeric anhydride 8.

Polymeric anhydride 9: Charged Acid-ended polymer 9 (90.00 parts) and acetic anhydride (6.49 parts) to a reaction vessel fitted with a Dean Stark trap and heated to 120° C. under nitrogen. After 6 hours, increased the temperature to 150° C. After a further 17½ hours, removed the Dean Stark trap to leave an open port. After a further 1 hour, reaction stopped to yield a clear brown liquid. This is Polymeric anhydride 9.

Polymeric anhydride 10: Charged Acid-ended polymer 10 (120.00 parts) and acetic anhydride (8.03 parts) to a reaction vessel fitted with a Dean Stark trap and heated to 120° C. under nitrogen. After 6 hours, increased the temperature to 150° C. After a further 23 hours, reaction stopped to yield a clear dark brown liquid. This is Polymeric anhydride 10.

Polymeric anhydride 11: Charged Acid-ended polymer 11 (120.01 parts) and acetic anhydride (8.15 parts) to a reaction vessel fitted with a Dean Stark trap and heated to 120° C. under nitrogen. After 6 hours, increased the temperature to 150° C. After a further 20 hours, removed the Dean Stark trap to leave an open port. After a further 1 hour, reaction stopped to yield a clear orange liquid. This is Polymeric anhydride 11.

Polymeric anhydride 12: Charged Acid-ended polymer 12 (100.18 parts) and acetic anhydride (6.96 parts) to a reaction vessel fitted with a Dean Stark trap and heated to 120° C. under nitrogen. After 6 hours, increased the temperature to 150° C. After a further 9 hours, removed the Dean Stark trap to leave an open port. After a further 1 hour, reaction stopped to yield a light brown solid at room temperature. This is Polymeric anhydride 12.

Polymeric anhydride 13: Charged Acid-ended polymer 13 (69.98 parts) and acetic anhydride (4.73 parts) to a reaction vessel fitted with a Dean Stark trap and heated to 120° C. under nitrogen. After 6 hours, increased the temperature to 150° C. After a further 12.75 hours, removed the Dean Stark trap to leave an open port. After a further 1 hour, reaction stopped to yield a clear liquid at room temperature. This is Polymeric anhydride 13.

Polymeric anhydride 14: Charged Acid-ended polymer 14 (86.04 parts) and acetic anhydride (5.19 parts) to a reaction vessel fitted with a Dean Stark trap and heated to 120° C. under nitrogen. After 6 hours, increased the temperature to 150° C. After a further 16 hours, removed the Dean Stark trap to leave an open port. After a further 1 hour, reaction stopped to yield a pale yellow clear liquid at room temperature. This is Polymeric anhydride 14.

Polymeric anhydride 15: Charged Acid-ended polymer 15 (65.01 parts) and acetic anhydride (4.02 parts) to a reaction vessel fitted with a Dean Stark trap and heated to 120° C. under nitrogen. After 6 hours, increased the temperature to 150° C. After a further 16.5 hours, removed the Dean Stark trap to leave an open port. After a further 1 hour, reaction stopped to yield a yellow clear liquid at room temperature. This is Polymeric anhydride 15.

Polymeric anhydride 16: Charged Acid-ended polymer 16 (60.00 parts) and acetic anhydride (4.26 parts) to a reaction vessel fitted with a Dean Stark trap and heated to 120° C. under nitrogen. After 6 hours, increased the temperature to 150° C. After a further 15 hours, removed the Dean Stark trap to leave an open port. After a further 1 hour, reaction stopped to yield a golden clear liquid at room temperature. This is Polymeric anhydride 16.

Polymeric anhydride 17: Charged Acid-ended polymer 17 (102 parts) and acetic anhydride (12 parts) to a reaction vessel fitted with a Dean Stark trap and heated to 120° C. with stirring under a nitrogen atmosphere. After 10 hours, increased the temperature to 150° C. After a further 4 hours, reaction stopped to yield a pale yellow liquid. This is Polymeric Anhydride 17.

Polymeric anhydride 18: Charged Acid-ended polymer 18 (78 parts) and acetic anhydride (10 parts) to a reaction vessel fitted with a Dean Stark trap and heated to 120° C. under a nitrogen atmosphere. After 6 hours, increased the temperature to 150° C. to remove excess acetic anhydride and residual acetic acid. After a further 4 hours, reaction stopped to yield a pale amber waxy solid. This is Polymeric Anhydride 18.

Polymeric anhydride 19: Charged Acid-ended polymer 18 (230 parts) and acetic anhydride (35 parts) to a reaction vessel fitted with a Dean Stark trap and heated to 120° C. under a nitrogen atmosphere. After 6 hours, increased the temperature to 150° C. to remove excess acetic anhydride and residual acetic acid. After a further 4 hours, reaction stopped to yield a pale yellow liquid. This is Polymeric Anhydride 19.

Polymeric anhydride 20: Charged Acid-ended polymer 20 (101 parts) and acetic anhydride (10 parts) to a reaction vessel fitted with a Dean Stark trap and heated to 120° C. under a nitrogen atmosphere. After 10 hours, increased the temperature to 150° C. After a further 10 hours, reaction stopped to yield a pale yellow liquid. This is Polymer Anhydride 20.

Polymeric anhydride 21: Charged Acid-ended polymer 21 (52 parts) and acetic anhydride (6 parts) to a reaction vessel fitted with a Dean Stark trap and heated to 120° C. under a nitrogen atmosphere. After 6 hours, increased the temperature to 150° C. to remove excess acetic anhydride and residual acetic acid. After a further 4 hours, reaction stopped to yield a dark amber liquid. This is Polymeric Anhydride 21.

Polymeric anhydride 22: Charged Acid-ended polymer 22 (85.04 parts) and acetic anhydride (3.87 parts) to a reaction vessel fitted with a Dean Stark trap and heated to 120° C. under a nitrogen atmosphere. After 6 hours, increased the temperature to 150° C. After a further 7 hours, reaction stopped to yield a brown viscous liquid. This is Polymer Anhydride 22.

Polymeric anhydride 23: Charged Acid-ended polymer 23 (50.03 parts) and acetic anhydride (3.2 parts) to a reaction vessel fitted with a Dean Stark trap and heated to 120° C. under a nitrogen atmosphere. After 6 hours, increased the temperature to 150° C. After a further 13.25 hours, reaction stopped to yield a brown solid. This is Polymer Anhydride 23.

Polymeric anhydride 24: Charged Acid-ended polymer 24 (130.05 parts) and acetic anhydride (8.72 parts) to a reaction vessel fitted with a Dean Stark trap and heated to 120° C. under a nitrogen atmosphere. After 6 hours, increased the temperature to 150° C. After a further 12.75 hours, reaction stopped to yield a pale cream solid. This is Polymer Anhydride 24.

Polymeric anhydride 25: Charged Acid-ended polymer 25 (60.04 parts) and acetic anhydride (4.04 parts) to a reaction vessel fitted with a Dean Stark trap and heated to 120° C. under a nitrogen atmosphere. After 6 hours, increased the temperature to 150° C. After a further 9 hours, reaction stopped to yield a cream wax solid. This is Polymer Anhydride 25.

Polymeric anhydride 26: Charged Acid-ended polymer 26 (60.08 parts) and acetic anhydride (4.33 parts) to a reaction vessel fitted with a Dean Stark trap and heated to 120° C. under a nitrogen atmosphere. After 6 hours, increased the temperature to 150° C. After a further 26.5 hours, reaction stopped to yield a brown solid. This is Polymer Anhydride 26.

Step 4—Reaction of Polymeric Anhydride with Multi-Amine to Generate Dispersant.

Dispersant 1: Charged Polymeric anhydride 1 (50.01 parts) to a reaction vessel and heated to 70° C., then charged Epomin™ SP018 (3.86 parts, which had been pre-heated to 70° C.). After 1 hour, reaction stopped to yield a pale yellow waxy solid with an acid value of 44 mg KOH/g and a base equivalence of 1060. This is Dispersant 1.

Dispersant 2: Charged Polymeric anhydride 1 (45.01 parts) and Polymeric anhydride 2 (15.03 parts) to a reaction vessel and heated to 70° C., then charged Epomin™ SP018 (4.61 parts, which had been pre-heated to 70° C.). After 1 hour, reaction stopped to yield a brownish yellow waxy solid with an acid value of 56 mg KOH/g and a base equivalence of 1221. This is Dispersant 2.

Dispersant 3: Charged Polymeric anhydride 3 (129.75 parts) to a reaction vessel and heated to 70° C., then charged Epomin™ SP018 (10.00 parts, which had been pre-heated to 70° C.). After 1 hour, reaction stopped to yield a brown paste with an acid value of 16 mg KOH/g and a base equivalence of 1053. This is Dispersant 3.

Dispersant 4: Charged Polymeric anhydride 4 (40.02 parts) to a reaction vessel and heated to 70° C., then charged Epomin™ SP018 (3.08 parts, which had been pre-heated to 70° C.). After 1 hour, reaction stopped to yield a hazy dark brown liquid with an acid value of 27 mg KOH/g and a base equivalence of 1246. This is Dispersant 4.

Dispersant 5: Charged Polymeric anhydride 5 (40.00 parts) to a reaction vessel and heated to 70° C., then charged Epomin™ SP018 (3.09 parts, which had been pre-heated to 70° C.). After 1 hour, reaction stopped to yield a hazy viscous pale brown liquid with an acid value of 14 mg KOH/g and a base equivalence of 1228. This is Dispersant 5.

Dispersant 6: Charged Polymeric anhydride 6 (50.01 parts) to a reaction vessel and heated to 70° C., then charged Epomin™ SP018 (3.86 parts, which had been pre-heated to 70° C.). After 1 hour, reaction stopped to yield a dark brown waxy solid with an acid value of 26 mg KOH/g and a base equivalence of 993. This is Dispersant 6.

Dispersant 7: Charged Polymeric anhydride 7 (34.98 parts) to a reaction vessel and heated to 70° C., then charged Epomin™ SP018 (2.69 parts, which had been pre-heated to 70° C.). After 1 hour, reaction stopped to yield a clear pale-yellow liquid with an acid value of 18 mg KOH/g and a base equivalence of 958. This is Dispersant 7.

Dispersant 8: Charged Polymeric anhydride 8 (130.01 parts) to a reaction vessel and heated to 70° C., then charged Epomin™ SP018 (10.01 parts, which had been pre-heated to 70° C.). After 1 hour, reaction stopped to yield a dark brown liquid with an acid value of 32 mg KOH/g and a base equivalence of 1008. This is Dispersant 8.

Dispersant 9: Charged Polymeric anhydride 9 (50.00 parts) to a reaction vessel and heated to 70° C., then charged Epomin™ SP018 (3.85 parts, which had been pre-heated to 70° C.). After 1 hour, reaction stopped to yield a clear brown liquid with an acid value of 16 mg KOH/g and a base equivalence of 1071. This is Dispersant 9.

Dispersant 10: Charged Polymeric anhydride 1 (70.04 parts) to a reaction vessel and heated to 70° C., then charged Epomin™ SP018 (3.93 parts, which had been pre-heated to 70° C.). After 1 hour, reaction stopped to yield a brownish yellow waxy solid with an acid value of 49 mg KOH/g and a base equivalence of 1946. This is Dispersant 10.

Dispersant 11: Charged Polymeric anhydride 1 (50.00 parts) to a reaction vessel and heated to 70° C., then charged Epomin™ SP018 (5.56 parts, which had been pre-heated to 70° C.). After 1 hour, reaction stopped to yield a pale yellow waxy solid with an acid value of 50 mg KOH/g and a base equivalence of 634. This is Dispersant 11.

Dispersant 12: Charged Polymeric anhydride 1 (60.00 parts) to a reaction vessel and heated to 70° C., then charged Epomin™ SP006 (4.61 parts, which had been pre-heated to 70° C.). After 1 hour, reaction stopped to yield a pale yellow solid with an acid value of 43 mg KOH/g and a base equivalence of 1145. This is Dispersant 12.

Dispersant 13: Charged Polymeric anhydride 10 (60.00 parts) to a reaction vessel and heated to 70° C., then charged Epomin™ SP018 (4.62 parts, which had been pre-heated to 70° C.). After 1 hour, reaction stopped to yield a clear dark brown viscous liquid with an acid value of 28 mg KOH/g and a base equivalence of 1119. This is Dispersant 13.

Dispersant 14: Charged Polymeric anhydride 11 (60.01 parts) to a reaction vessel and heated to 70° C., then charged Epomin™ SP018 (4.63 parts, which had been pre-heated to 70° C.). After 1 hour, reaction stopped to yield a hazy viscous brown liquid with an acid value of 19 mg KOH/g and a base equivalence of 1221. This is Dispersant 14.

Dispersant 15: Charged Polymeric anhydride 9 (60.00 parts) to a reaction vessel and heated to 70° C., then charged succinic anhydride (0.94 parts) and Epomin™ SPO18 (4.62 parts, which had been pre-heated to 70° C.). After 1 hour, reaction stopped to yield a hazy brown liquid with an acid value of 24 mg KOH/g and a base equivalence of 1104. This is Dispersant 15.

Dispersant 16: Charged Polymeric anhydride 12 (70.01 parts) to a reaction vessel and heated to 70° C., then charged Epomin™ SP018 (5.37 parts, which had been pre-heated to 70° C.). After 1 hour, reaction stopped to yield a dark brown solid at room temperature with an acid value of 32 mg KOH/g and a base equivalence of 910. This is Dispersant 16.

Dispersant 17: Charged Polymeric anhydride 13 (50.02 parts) to a reaction vessel and heated to 70° C., then charged Epomin™ SP018 (3.83 parts, which had been pre-heated to 70° C.). After 1 hour, reaction stopped to yield a hazy yellow liquid at room temperature with an acid value of 18.25 mg KOH/g and a base equivalence of 1152.11. This is Dispersant 17.

Dispersant 18: Charged Polymeric anhydride 14 (70.05 parts) to a reaction vessel and heated to 70° C., then charged Epomin™ SP018 (5.37 parts, which had been pre-heated to 70° C.). After 1 hour, reaction stopped to yield a golden liquid at room temperature with an acid value of 28.27 mg KOH/g and a base equivalence of 1013.35. This is Dispersant 18.

Dispersant 19: Charged Polymeric anhydride 15 (43.98 parts) to a reaction vessel and heated to 70° C., then charged Epomin™ SP018 (3.38 parts, which had been pre-heated to 70° C.). After 1 hour, reaction stopped to yield a brown liquid at room temperature with an acid value of 29.89 mg KOH/g and a base equivalence of 1068.52. This is Dispersant 19.

Dispersant 20: Charged Polymeric anhydride 16 (49.99 parts) to a reaction vessel and heated to 70° C., then charged Epomin™ SP018 (3.84 parts, which had been pre-heated to 70° C.). After 1 hour, reaction stopped to yield an orange viscous clear liquid at room temperature with an acid value of 30.64 mg KOH/g and a base equivalence of 1158.4. This is Dispersant 20.

Dispersant 21: Charged Polymeric anhydride 17 (51 parts) to a reaction vessel and heated to 70° C. with stirring under a nitrogen atmosphere, then charged Epomin™ SP018 (3 parts, which had been pre-heated to 70° C.). After 1 hour, reaction stopped to yield a pale yellow liquid with an acid value of 12.6 mg KOH/g and a base equivalence of 1516. This is Dispersant 21.

Dispersant 22: Charged Polymeric anhydride 18 (75 parts) to a reaction vessel and heated to 70° C., then charged Epomin™ SP018 (6.5 parts, which had been pre-heated to 70° C.). After 1 hour, reaction stopped to yield a light brown waxy solid with an acid value of 22.7 mg KOH/g and a base equivalence of 1083. This is Dispersant 22.

Dispersant 23: Charged Polymeric anhydride 19 (50 parts) to a reaction vessel and heated to 70° C., then charged Epomin SP200 (5 parts, which had been pre-heated to 70° C.). After 1 hour, reaction stopped to yield an amber liquid with an acid value of 44.5 mg KOH/g and a base equivalence of 930. This is Dispersant 23.

Dispersant 24: Charged Polymeric anhydride 19 (50 parts) to a reaction vessel and heated to 70° C., then charged Epomin™ SP018 (5 parts, which had been pre-heated to 70° C.). After 1 hour, reaction stopped to yield an amber liquid with an acid value of 43.1 mg KOH/g and a base equivalence of 962. This is Dispersant 24.

Dispersant 25: Charged Polymeric anhydride 20 (51 parts) to a reaction vessel and heated to 70° C., then charged Epomin™ SP200 (4 parts, which had been pre-heated to 70° C.). After 1 hour, reaction stopped to yield a pale amber liquid with an acid value of 19.2 mg KOH/g and a base equivalence of 1203. This is Dispersant 25.

Dispersant 26: Charged Polymeric anhydride 20 (45 parts) to a reaction vessel and heated to 70° C., then charged Epomin™ SP200 (5 parts, which had been pre-heated to 70° C.). After 1 hour, reaction stopped to yield a pale amber liquid with an acid value of 25 mg KOH/g and a base equivalence of 753. This is Dispersant 26.

Dispersant 27: Charged Dispersant 18 (39.99 parts) to a reaction vessel and heated to 70° C. under nitrogen, then charged caprolactone (0.81 parts). After one hour, stopped the reaction to yield a viscous liquid/paste, with an acid value of 27.45 mgKOH/g and a base equivalence of 1257.93. This is Dispersant 27.

Dispersant 28: Charged Dispersant 16 (40.17 parts) to a reaction vessel and heated to 70° C. under nitrogen, then charged ortho phosphoric acid (85% w/w 0.82 parts) and toluene (40.96 parts). After one hour, stopped the reaction to yield a viscous liquid/paste, with an acid value of 24.13 mgKOH/g and a base equivalence of 1174.43. This is Dispersant 28.

Dispersant 29: Charged Dispersant 19 (30.24 parts) to a reaction vessel and heated to 70° C. under nitrogen, then charged butyl acrylate (0.57 parts). After one hour, stopped the reaction to yield a viscous liquid/paste, with an acid value of 25.79 mgKOH/g and a base equivalence of 1384.03. This is Dispersant 29.

Dispersant 30: A Charged Dispersant 1 (35.09 parts) to a reaction vessel and heated to 70° C. under nitrogen, then charged Dimethyl sulfate (0.7 parts). After one hour, stopped the reaction to yield a viscous liquid/paste, with an acid value of 49.56 mgKOH/g and a base equivalence of 1535.18. This is Dispersant 30.

Dispersant 31: Charged Dispersant 3 (50.03 parts) to a reaction vessel and heated to 70° C. under nitrogen, then charged Example 198 from U.S. Pat. No. 6,197,877 (1.00 parts), which had been pre heated to 70° C. After one hour, stopped the reaction to yield a viscous liquid/paste, with an acid value of 16.13 mgKOH/g and a base equivalence of 1240.25. This is Dispersant 31.

Dispersant 32: Charged Polymeric anhydride 21 (52 parts) to a reaction vessel and heated to 70° C., then charged Epomin™ SP018 (3.8 parts, which had been pre-heated to 70° C.). After 1 hour, reaction stopped to yield a dark amber liquid with an acid value of 15.9 mg KOH/g and a base equivalence of 679. This is Dispersant 32.

Dispersant 33: Charged Polymeric anhydride 22 (70.02 parts) to a reaction vessel and heated to 70° C., then charged Epomin™ SP018 (5.42 parts, which had been pre-heated to 70° C.). After 1 hour, reaction stopped to yield a brown viscous liquid at room temperature with an acid value of 25.23 mg KOH/g and a base equivalence of 1025.32. This is Dispersant 33.

Dispersant 34: Charged Polymeric anhydride 23 (40.03 parts) to a reaction vessel and heated to 70° C., then charged Epomin™ SP018 (3.08 parts, which had been pre-heated to 70° C.). After 1 hour, reaction stopped to yield a brown solid at room temperature with an acid value of 24.95 mg KOH/g and a base equivalence of 990.76. This is Dispersant 34.

Dispersant 35: Charged Polymeric anhydride 24 (100.14 parts) to a reaction vessel and heated to 70° C., then charged Epomin™ SP018 (7.66 parts, which had been pre-heated to 70° C.). After 1 hour, reaction stopped to yield a cream solid at room temperature with an acid value of 18.85 mg KOH/g and a base equivalence of 1184.82. This is Dispersant 35.

Dispersant 36: Charged Polymeric anhydride 25 (50.03 parts) to a reaction vessel and heated to 70° C., then charged Epomin™ SP018 (3.87 parts, which had been pre-heated to 70° C.). After 1 hour, reaction stopped to yield a beige solid at room temperature with an acid value of 22.75 mg KOH/g and a base equivalence of 1123.03. This is Dispersant 36.

Dispersant 37: Charged Polymeric anhydride 26 (40.01 parts) to a reaction vessel and heated to 70° C., then charged Epomin SP018 (3.11 parts, which had been pre-heated to 70° C.). After 1 hour, reaction stopped to yield a brown solid at room temperature with an acid value of 22.58 mg KOH/g and a base equivalence of 899.5. This is Dispersant 37.

Dispersant 38: Charged Polymeric anhydride 9 (47.09 parts) and Polymeric anhydride 1 (47 parts) to a reaction vessel and heated to 70° C., then charged Epomin™ SP018 (7.27 parts, which had been pre-heated to 70° C.). After 1 hour, reaction stopped to yield a brown liquid at room temperature with an acid value of 46.21 mg KOH/g and a base equivalence of 1064.50. This is Dispersant 38.

COMPARATIVE EXAMPLES

The below examples are based of the teaching in the literature that acid ended polymers can readily be reacted with multi-functional polyamines (especially PEI) and hence in each comparative example we have taken the same acid-ended polymer that was used as an intermediate to create in each case the closes possible comparative example.

The reaction conditions used are stirring the acid-ended polymer with the multi-functional polyamine (especially PEI) at 120° C. for 6 hours as these are the reaction conditions used in U.S. Pat. No. 6,197,877 dispersants 1 to 29 (examples 30 to 59) where polyester based PEI dispersants are made. And are the same reaction condition used in U.S. Pat. No. 7,767,750 (WO2005/010109 A2) Dispersant 1 to 28 where polyether based PEI dispersants are made.

Comparative Example 1: Charged Acid-ended polymer 1 (30.05 parts) to a reaction vessel and heated to 70° C., then charged Epomin™ SP018 (2.31 parts, which had been pre-heated to 70° C.), and increased the temperature to 120° C. After 6 hours, reaction stopped to yield a brownish orange waxy solid with an acid value of 26 mg KOH/g and a base equivalence of 1392. This is Comparative Example 1.

Comparative Example 2: Charged Acid-ended polymer 3 (60.01 parts) to a reaction vessel and heated to 70° C., then charged Epomin™ SP018 (4.62 parts, which had been pre-heated to 70° C.), and increased the temperature to 120° C. After 6 hours, reaction stopped to yield a brown paste with an acid value of 19 mg KOH/g and a base equivalence of 1505. This is Comparative Example 2.

Comparative Example 3: Charged Acid-ended polymer 4 (60.02 parts) to a reaction vessel and heated to 70° C., then charged Epomin™ SP018 (4.62 parts, which had been pre-heated to 70° C.), and increased the temperature to 120° C. After 6 hours, reaction stopped to yield a hazy dark brown liquid with an acid value of 31 mg KOH/g and a base equivalence of 1882. This is Comparative Example 3.

Comparative Example 4: Charged Acid-ended polymer 5 (60.01 parts) to a reaction vessel and heated to 70° C., then charged Epomin™ SP018 (4.64 parts, which had been pre-heated to 70° C.), and increased the temperature to 120° C. After 6 hours, reaction stopped to yield a hazy viscous pale brown liquid with an acid value of 30 mg KOH/g and a base equivalence of 1791. This is Comparative Example 4.

Comparative Example 5: Charged Acid-ended polymer 6 (50.00 parts) to a reaction vessel and heated to 70° C., then charged Epomin™ SP018 (3.87 parts, which had been pre-heated to 70° C.), and increased the temperature to 120° C. After 6 hours, reaction stopped to yield a non-homogeneous mixture of solid and hazy liquid with an acid value of 20 mg KOH/g and a base equivalence of 1745. This is Comparative Example 5.

Comparative Example 6: Charged Acid-ended polymer 7 (50.02 parts) to a reaction vessel and heated to 70° C., then charged Epomin™ SP018 (3.85 parts, which had been pre-heated to 70° C.), and increased the temperature to 120° C. After 6 hours, reaction stopped to yield a hazy brown liquid with an acid value of 26 mg KOH/g and a base equivalence of 1369. This is Comparative Example 6.

Comparative Example 7: Charged Acid-ended polymer 8 (80.00 parts) to a reaction vessel and heated to 70° C., then charged Epomin™ SP018 (6.15 parts, which had been pre-heated to 70° C.), and increased the temperature to 120° C. After 6 hours, reaction stopped to yield a milky yellow liquid with an acid value of 35 mg KOH/g and a base equivalence of 1502. This is Comparative Example 7.

Comparative Example 8: Charged Acid-ended polymer 9 (50.01 parts) to a reaction vessel and heated to 70° C., then charged Epomin™ SP018 (3.85 parts, which had been pre-heated to 70° C.), and increased the temperature to 120° C. After 6 hours, reaction stopped to yield a clear orange liquid with an acid value of 15 mg KOH/g and a base equivalence of 1452. This is Comparative Example 8.

Comparative Example 9: Charged Acid-ended polymer 10 (60.01 parts) to a reaction vessel and heated to 70° C., then charged Epomin™ SP018 (4.62 parts, which had been pre-heated to 70° C.), and increased the temperature to 120° C. After 6 hours, reaction stopped to yield a clear orange liquid with an acid value of 25 mg KOH/g and a base equivalence of 1558. This is Comparative Example 9.

Comparative Example 10: Charged Acid-ended polymer 11 (60.00 parts) to a reaction vessel and heated to 70° C., then charged Epomin™ SP018 (4.64 parts, which had been pre-heated to 70° C.), and increased the temperature to 120° C. After 6 hours, reaction stopped to yield a viscous brown liquid with an acid value of 30 mg KOH/g and a base equivalence of 1900. This is Comparative Example 10.

Comparative Example 11: Charged Acid-ended polymer 12 (50.00 parts) to a reaction vessel and heated to 70° C., then charged Epomin™ SP018 (3.87 parts, which had been pre-heated to 70° C.), and increased the temperature to 120° C. After 6 hours, reaction stopped to yield a yellow solid at room temperature with an acid value of 24 mg KOH/g and a base equivalence of 1409. This is Comparative Example 11.

Comparative Example 12: Charged Acid-ended polymer 13 (50.51 parts) to a reaction vessel and heated to 70° C., then charged Epomin™ SP018 (3.98 parts, which had been pre-heated to 70° C.), and increased the temperature to 120° C. After 6 hours, reaction stopped to yield a cloudy orange viscous liquid at room temperature with an acid value of 27.01 mg KOH/g and a base equivalence of 1298.10. This is Comparative Example 12.

Comparative Example 13: Charged Acid-ended polymer 14 (65.98 parts) to a reaction vessel and heated to 70° C., then charged Epomin™ SP018 (5.06 parts, which had been pre-heated to 70° C.), and increased the temperature to 120° C. After 6 hours, reaction stopped to yield a clear brown liquid at room temperature with an acid value of 20.89 mg KOH/g and a base equivalence of 1131.20. This is Comparative Example 13.

Comparative Example 14: Charged Acid-ended polymer 15 (45.13 parts) to a reaction vessel and heated to 70° C., then charged Epomin™ SP018 (3.59 parts, which had been pre-heated to 70° C.), and increased the temperature to 120° C. After 6 hours, reaction stopped to yield an opaque light brown liquid at room temperature with an acid value of 18.71 mg KOH/g and a base equivalence of 2690.50. This is Comparative Example 14.

Comparative Example 15: Charged Acid-ended polymer 17 (51 parts) to a reaction vessel and heated to 70° C. with stirring under a nitrogen atmosphere, then charged Epomin™ SP018 (3 parts, which had been pre-heated to 70° C.). Heated to 120° C. with stirring under a nitrogen atmosphere. After 10 hours, reaction stopped to yield a pale yellow hazy liquid with an acid value 9.2 mg KOH/g and base equivalence 1998. This is Comparative Example 15.

Comparative Example 16: Charged Acid-ended polymer 20 (39 parts) to a reaction vessel and heated to 70° C. with stirring under a nitrogen atmosphere, then charged Epomin™ SP200 (3 parts, which had been pre-heated to 70° C.). Heated to 120° C. with stirring under a nitrogen atmosphere. After 6 hours, reaction stopped to yield a dark amber liquid with an acid value 9.8 mg KOH/g and base equivalence 1586. This is Comparative Example 16.

Comparative Example 17: Charged Acid-ended polymer 21 (52 parts) to a reaction vessel and heated to 70° C. with stirring under a nitrogen atmosphere, then charged Epomin™ SP018 (4 parts, which had been pre-heated to 70° C.). Heated to 120° C. with stirring under a nitrogen atmosphere. After 6 hours, reaction stopped to yield a yellow liquid with an acid value 12.3 mg KOH/g and base equivalence 789. This is Comparative Example 17.

APPLICATION TESTING

Application Testing Reagents

Dowanol MPA—from Sigma Aldrich
Toluene—from Fisher Scientific
Ethanol—from Fisher Scientific
Ethyl acetate—from Fisher Scientific
Exxol D140—From ExxonMobil
Heliogen Blue L7101F—from BASF
Irgalite Rubine D4240—from BASF
Symular Carmine 6B400s—Sun Chemicals
Bayferrox 130M—from Lanxess
3 mm glass beads—from Sigmund Lindner Application Results Each Dispersant (0.25 parts) indicated in Tables 2-5 below was added to an 8 dram vial and solvent (8.25 parts) was added. The dispersant was then dissolved by shaking and heating as necessary. Once dissolved, 3 mm glass beads (17 parts) were added, followed by Heliogen Blue L7101F (1.50 parts). The vials were then sealed and shaken on a horizontal shaker for 16 hours. The resulting dispersion was then assessed for fluidity using a visual characterization scale of A to E (fluid to viscous):

A—free movement of glass beads (fluid)

B—movement 1 minute after shaking

C—movement 10 seconds after shaking

D—movement during shaking

E—no movement (gelled)

TABLE 1

Pigment dispersion results. Solvent: Dowanol MPA

| Dispersant | Fluidity Grade | Dispersant | Fluidity Grade |
|---|---|---|---|
| Comparative Example 6 | D | Dispersant 7 | B |
| Comparative Example 7 | D | Dispersant 8 | C/B |

TABLE 2

Pigment dispersion results. Solvent: Toluene

| Dispersant | Fluidity Grade | Dispersant | Fluidity Grade |
|---|---|---|---|
| Comparative Example 1 | C/D | Dispersant 1 | B/A |
| | | Dispersant 2 | B/A |
| | | Dispersant 10 | B |
| | | Dispersant 11 | B/A |
| | | Dispersant 12 | B/A |
| | | Dispersant 38 | A |
| Comparative Example 2 | C | Dispersant 3 | B/A |
| Comparative Example 3 | D/C | Dispersant 4 | C/B |
| Comparative Example 4 | D/C | Dispersant 5 | C/D |
| Comparative Example 5 | C | Dispersant 6 | B/A |
| Comparative Example 6 | C | Dispersant 7 | A/B |
| Comparative Example 8 | D/C | Dispersant 9 | B/A |
| Comparative Example 9 | B | Dispersant 13 | B/A |
| Comparative Example 11 | C | Dispersant 16 | B |
| | | Dispersant 28 | C/B |

TABLE 3

Pigment dispersion results. Solvent: 1:1 ethanol/ethyl acetate

| Dispersant | Fluidity Grade | Dispersant | Fluidity Grade |
|---|---|---|---|
| Comparative Example 5 | D | Dispersant 6 | A |
| Comparative Example 8 | D | Dispersant 9 | A |

TABLE 4

Pigment dispersion results. Solvent: 4:1 ethanol/ethyl acetate

| Dispersant | Fluidity Grade | Dispersant | Fluidity Grade |
|---|---|---|---|
| Comparative Example 5 | D | Dispersant 6 | A |
| Comparative Example 8 | D | Dispersant 9 | A |

Each Dispersant (0.40 parts) indicated in Tables 6-9 below was added to an 8 dram vial and solvent (7.60 parts) was added. The dispersant was then dissolved by shaking and heating as necessary. Once dissolved, 3 mm glass beads (17 parts) were added, followed by Irgalite Rubine D4240 (2.00 parts). The vials were then sealed and shaken on a horizontal shaker for 16 hours. The resulting dispersion was then assessed for fluidity using a visual characterization scale of A to E (fluid to viscous):

- A—free movement of glass beads (fluid)
- B—movement 1 minute after shaking
- C—movement 10 seconds after shaking
- D—movement during shaking
- E—no movement (gelled)

TABLE 5

Pigment dispersion results. Solvent: Ethanol

| Dispersant | Fluidity Grade | Dispersant | Fluidity Grade |
|---|---|---|---|
| Comparative Example 6 | D/C | Dispersant 7 | A |
| Comparative Example 8 | D | Dispersant 9 | B/A |
|  |  | Dispersant 15 | B/A |
| Comparative Example 13 | D | Dispersant 18 | C |

TABLE 6

Pigment dispersion results. Solvent: Toluene

| Dispersant | Fluidity Grade | Dispersant | Fluidity Grade |
|---|---|---|---|
| Comparative Example 3 | C | Dispersant 4 | B/A |
| Comparative Example 8 | D | Dispersant 9 | B/A |
| Comparative Example 9 | C | Dispersant 13 | A |

TABLE 7

Pigment dispersion results. Solvent: Exxol D140

| Dispersant | Fluidity Grade | Dispersant | Fluidity Grade |
|---|---|---|---|
| Comparative Example 13 | B/C | Dispersant 18 | A/B |
|  |  | Dispersant 27 | B |
|  |  | Dispersant 33 | A |

TABLE 8

Pigment dispersion results. Solvent: 2.5:1 Xylene/Butanol

| Dispersant | Fluidity Grade | Dispersant | Fluidity Grade |
|---|---|---|---|
| Comparative Example 1 | D/E | Dispersant 34 | A |

TABLE 8-continued

Pigment dispersion results. Solvent: 2.5:1 Xylene/Butanol

| Dispersant | Fluidity Grade | Dispersant | Fluidity Grade |
|---|---|---|---|
| Comparative Example 11 | D | Dispersant 35 | A |

Each Dispersant (0.40 parts) indicated in Table 10 below was added to an 8 dram vial and solvent (7.60 parts) was added. The dispersant was then dissolved by shaking and heating as necessary. Once dissolved, 3 mm glass beads (17 parts) were added, followed by Symuler Carmine 6B400s (2.00 parts). The vials were then sealed and shaken on a horizontal shaker for 16 hours. The resulting dispersion was then assessed for fluidity using a visual characterization scale of A to E (fluid to viscous):

- A—free movement of glass beads (fluid)
- B—movement 1 minute after shaking
- C—movement 10 seconds after shaking
- D—movement during shaking
- E—no movement (gelled)

TABLE 9

Pigment dispersion results. Solvent: 4:1 Ethanol/Ethyl Acetate

| Dispersant | Fluidity Grade | Dispersant | Fluidity Grade |
|---|---|---|---|
| Comparative Example 14 | D/C | Dispersant 19 | A/B |
|  |  | Dispersant 29 | A |

Each Dispersant (0.40 parts) indicated in Table 11 below was added to an 8 dram vial and solvent (7.60 parts) was added. The dispersant was then dissolved by shaking and heating as necessary. Once dissolved, 3 mm glass beads (17 parts) were added, followed by Irgalite Rubine (2.00 parts). The vials were then sealed and shaken on a horizontal shaker for 16 hours. The resulting dispersion was then assessed for fluidity using a visual characterization scale of A to E (fluid to viscous).

- A—free movement of glass beads (fluid)
- B—movement 1 minute after shaking
- C—movement 10 seconds after shaking
- D—movement during shaking
- E—no movement (gelled)

TABLE 10

Pigment dispersion results. Solvent: 1:1 Ethanol/Ethyl Acetate

| Dispersant | Fluidity Grade | Dispersant | Fluidity Grade |
|---|---|---|---|
| Comparative Example 12 | C | Dispersant 17 | A |

Each Dispersant (0.10 parts) indicated in Table 12 below was added to an 8 dram vial and solvent (4.90 parts) was added. The dispersant was then dissolved by shaking and heating as necessary. Once dissolved, 3 mm glass beads (17 parts) were added, followed by Bayferrox 130M (5.00 parts). The vials were then sealed and shaken on a horizontal shaker for 16 hours. The resulting dispersion was then assessed for fluidity using a visual characterization scale of A to E (fluid to viscous):

A—free movement of glass beads (fluid)
B—movement 1 minute after shaking
C—movement 10 seconds after shaking
D—movement during shaking
E—no movement (gelled)

TABLE 11

Pigment dispersion results. Solvent: Toluene

| Dispersant | Fluidity Grade | Dispersant | Fluidity Grade |
|---|---|---|---|
| Comparative Example 1 | D/C | Dispersant 1 | C/B |
| Comparative Example 3 | D/C | Dispersant 4 | B/C |
| Comparative Example 6 | C | Dispersant 7 | A |
| Comparative Example 8 | D | Dispersant 9 | A/B |
| | | Dispersant 36 | A |

Dispersions are prepared by dissolving each Dispersant Example 21 and 25 and Comparative Examples 16 and 17 respectively (0.4 parts) in 4:1 ethanol:ethyl acetate (v:v) (7.6 parts). 3 mm glass beads (17 parts) and Irgalite Rubine D4240 pigment (2.0 parts, Pigment Red 57.1 exBASF) are then added to each solution and the contents milled on a horizontal shaker for 16 hrs. The viscosity is assessed by determining the freedom of the glass beads to move throughout the mill base. In all cases except where no agent is present, the pigment wetted out and a homogeneous dispersion is formed. The viscosity of the resulting dispersion is assessed using a visual characterization scale of A to E (good to poor). The results are given below which clearly illustrates that the dispersant of the invention produce superior more fluid dispersions. Particles sizes for each dispersion were obtained by taking a sample of the milling dispersion (0.04 parts) and diluting in 4:1 ethanol:ethyl acetate (v:v) (8 parts) and measuring the particle size on a Nanotrac DLS particle size analyzer. The results obtained are:

TABLE 12

Dispersion results on Irgalite Rubine

| Example | Viscosity Rating | Particle Size nm $D_{50}/D_{90}$ |
|---|---|---|
| Control (No dispersant) | E | Gelled |
| Comparative Example 15 | D | 497/1351 |
| Dispersant Example 21 | B | 308/419 |
| Comparative Example 16 | D | 329/451 |
| Dispersant Example 25 | B | 213/345 |
| Comparative Example 17 | D | 330/582 |
| Dispersant Example 32 | A | 163/289 |

Particle size analysis: Selected dispersions from Tables 2-12 above were diluted in the appropriate solvent (approx. 1:50 by volume). Particle size analysis was carried out for each dispersion indicated in Tables 9-10 below. D50 and D90 values were obtained from intensity-based distributions.

TABLE 13

Particle size analysis results. Pigment: Heliogen Blue L7101F. Solvent: Toluene

| Dispersant | D50/nm | D90/nm | Dispersant | D50/nm | D90/nm |
|---|---|---|---|---|---|
| Comparative Example 3 | 1732 | 2470 | Dispersant 4 | 908 | 1357 |
| Comparative Example 10 | 1578; 1065 | 2690; 3930 | Dispersant 14 | 685; 643 | 1059; 1078 |
| Comparative Example 11 | 4130 | 5520 | Dispersant 16 | 1047 | 1618 |

TABLE 14

Particle size analysis results. Pigment: Irgalite Rubine D4240. Solvent: Toluene

| Dispersant | D50/nm | D90/nm | Dispersant | D50/nm | D90/nm |
|---|---|---|---|---|---|
| Comparative Example 3 | 1578; 2307 | 2049; 3530 | Dispersant 4 | 561; 643 | 1264; 1168 |
| Comparative Example 9 | 445 | 761 | Dispersant 13 | 225 | 348 |

TABLE 15

Particle size analysis results. Pigment: Irgalite Rubine D4240. Solvent: Ethanol

| Dispersant | D50/nm | D90/nm | Dispersant | D50/nm | D90/nm |
|---|---|---|---|---|---|
| Comparative Example 13 | 479 | 706 | Dispersant 18 | 304 | 498 |

TABLE 16

Particle size analysis results. Pigment: Irgalite Rubine D4240. Solvent: Exxol D140

| Dispersant | D50/nm | D90/nm | Dispersant | D50/nm | D90/nm |
|---|---|---|---|---|---|
| Comparative Example 13 | 372 | 533 | Dispersant 18 | 284 | 444 |
| | | | Dispersant 27 | 262.2 | 509.0 |
| | | | Dispersant 33 | 195 | 367 |

TABLE 17

Particle size analysis results. Pigment: Irgalite Rubine D4240. Solvent: 1:1 Ethanol:Ethyl Acetate

| Dispersant | D50/nm | D90/nm | Dispersant | D50/nm | D90/nm |
|---|---|---|---|---|---|
| Comparative Example 12 | 331 | 557 | Dispersant 17 | 242 | 327 |

TABLE 18

Particle size analysis results. Pigment: Irgalite Rubine D4240. Solvent: 2.5:1 Xylene/Butanol

| Dispersant | D50/nm | D90/nm | Dispersant | D50/nm | D90/nm |
|---|---|---|---|---|---|
| Comparative Example 11 | 1278 | 2654 | Dispersant 34 | 321 | 512 |
| | | | Dispersant 35 | 249 | 375 |

Viscosity measurements: Viscosity was measured using a rheometer for selected dispersions from Tables 2-12 above. Two shear rates were selected for data comparison—40 s$^{-1}$ and 100 s$^{-1}$.

TABLE 19

Viscosity data. Pigment: Heliogen Blue L7101F. Solvent: Toluene

| Dispersant | Viscosity at 40 s$^{-1}$/ Pa·s | Viscosity at 100 s$^{-1}$/ Pa·s | Dispersant | Viscosity at 40 s$^{-1}$/ Pa·s | Viscosity at 100 s$^{-1}$/ Pa·s |
|---|---|---|---|---|---|
| Comparative Example 1 | 0.638 | 0.285 | Dispersant 1 | 0.421 | 0.198 |
| Comparative Example 3 | 0.763 | 0.376 | Dispersant 4 | 0.605 | 0.283 |

TABLE 20

Viscosity data. Pigment: Irgalite Rubine D4240. Solvent: Toluene

| Dispersant | Viscosity at 40 s$^{-1}$/ Pa·s | Viscosity at 100 s$^{-1}$/ Pa·s | Dispersant | Viscosity at 40 s$^{-1}$/ Pa·s | Viscosity at 100 s$^{-1}$/ Pa·s |
|---|---|---|---|---|---|
| Comparative Example 9 | 0.391 | 0.171 | Dispersant 13 | 0.00835 | 0.00784 |

As used herein, the transitional term "comprising", which is synonymous with "including", "containing," or "characterized by", is inclusive or open-ended and does not exclude additional, un-recited elements or method steps. However, in each recitation of "comprising" herein, it is intended that the term also encompass, as alternative embodiments, the phrases "consisting essentially of" and "consisting of", where "consisting of" excludes any element or step not specified and "consisting essentially of" permits the inclusion of additional un-recited elements or steps that do not materially affect the basic and novel characteristics of the composition or method under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of preparing a dispersant, wherein the method comprises the steps of:
   (a) providing an alcohol terminated polymer of the formula:
   X-(CH$_2$CHR$^1$—O)$_n$[R$^5$—N(R$^6$)]$_b$—[(C=O)R$^2$—O]$_m$—H, wherein
   X is R-Q or a cyclic amine, where R is a hydrocarbon chain containing 1 to 50 carbon atoms and Q is O, or NR$^7$, or NH, with the proviso that Q is only NH when n is 0 and b is 0,
   R$^7$ is a hydrocarbon chain containing between 1 and 18 carbon atoms;
   R$^1$ is H, methyl, or ethyl,
   R$^5$ is a hydrocarbon chain containing up to 3 carbon atoms;
   R$^6$ is hydrogen, a hydrocarbyl group containing 1 to 22 carbon atoms, or the residue of an alkyl (meth)acrylate or (meth) acrylamide;
   b is 0 or 1, with the proviso that b can only be 1 when both n and m are both at least 1;
   R$^2$ is a hydrocarbon chain containing 1 to 15 carbon atoms or —R$^8$(C=O)YR$^9$—, where Y is O or NH or NR$^{10}$, R$^8$ is a hydrocarbon chain containing 1 to 10 carbon atoms, R$^9$ is a hydrocarbon chain containing 1 to 10 carbon atoms, and R$^{10}$ is a hydrocarbon chain containing 1 to 20 carbon atoms,
   n is any integer from 0 to 65 and m is any integer from 0 to 35, with the proviso that m+n is at least 3;
   (b) reacting the alcohol ended polymer with a cyclic anhydride to provide an acid terminated polymer;
   (c) reacting the acid terminated polymer with a non-cyclic anhydride to provide a mixture of anhydrides;
   (d) reacting the mixture of anhydrides with a multi-amine species, wherein the multi-amine species has a number average molecular weight of 300 to 20,000 to form a dispersant molecule.

2. The method of claim 1, wherein X is R-Q and Q is Oxygen.

3. The method of claim 1, wherein X is R-Q and Q is NR$^7$.

4. The method of claim 1, wherein X is R-Q and Q is NH and n is 0 and b is 0.

5. The method of claim 1, wherein X is a cyclic secondary amine, selected from piperidine, morpholine, 4-methylpiperidine, 4-phenylpiperidine, thiomorpholine, azetidine, 1-methylpiperazine, 2-methylpiperazine, and pyrrolidine and mixtures thereof.

6. The method of claim 1, wherein R is a hydrocarbon chain containing 1 to 30 carbon atoms.

7. The method of claim 1, wherein R is a branched or linear, saturated or unsaturated, alkyl, aryl, aralkyl, or alkylaryl hydrocarbon chain.

8. The method of claim 1, wherein R further contains a halogen group.

9. The method of claim 1, wherein R contains a heteroatom selected from N or O.

10. The method of claim 1, wherein R$^7$ contains a functional group selected from the groups consisting of ether, ester, or amides.

11. The method of claim 1, wherein R$^6$ is H.

12. The method of claim 1, wherein R$^6$ is a hydrocarbon chain containing 1 to 22 carbon atoms.

13. The method of claim 1, wherein R$^6$ is the residue of an alkyl (meth)acrylate or (meth)acrylamide.

14. The method of claim 1, wherein R$^2$ is —R$^8$(C=O)YR$^9$—.

15. The method of claim 14, wherein Y is NH.

16. The method of claim 14, wherein Y is NR$^{10}$ where R$^{10}$ is a hydrocarbon chain containing 1 to 20 carbon atoms.

17. The method of claim 16, wherein R$^{10}$ contains an ester, ether, or amide group.

18. The method of claim 1, wherein R$^2$ is a linear or branched, saturated or unsaturated, hydrocarbon chain containing 1 to 10 carbon atoms.

19. The method of claim 18, wherein R$^2$ is a hydrocarbon chain containing 2 to 7 carbon atoms.

20. The method of claim 1, wherein R$^2$ is a hydrocarbon chain containing 2 to 15 carbon atoms and includes an amide functional group having the formula, —N(R$^{11}$)—(C=O)—, where R$^{11}$ is H or a hydrocarbon chain containing 1 to 4 carbon atoms.

21. The method of claim 1, wherein the cyclic anhydride is selected from the group consisting of glutaric anhydride, 1,2-cyclohexanedicarboxylic anhydride, homophthalic anhydride, diglycolic anhydride, succinic anhydride, polyisobutylene succinic anhydride, 2-phenylsuccinic anhydride, alk(en)yl succinic anhydride, or mixtures thereof.

22. The method of claim 21, wherein the cyclic anhydride comprises succinic anhydride.

23. The method of claim 21, wherein the cyclic anhydride comprises glutaric anhydride.

24. The method of claim 1, wherein the non-cyclic anhydride comprises propionic anhydride.

25. The method of claim 1, wherein the non-cyclic anhydride comprises acetic anhydride.

26. The method of claim 1, wherein the mixture of anhydrides and the multi-amine species are reacted at a weight ratio of between 1:1 to 25:1.

27. The method of claim 1, further comprising step (e):
reacting the dispersant molecule with (a) an isocyanate, lactone, epoxy, anhydride, cyclic carbonate, (meth) acrylate via Michael addition reaction, and/or a polymeric species having a group that reacts with a primary or secondary amine to form a salt or covalent bond, (b) an oxidizing species that could convert the amine group to a nitric oxide, (c) a salification agent, or (d) a tertiary amine group of said multi-amine species or the dispersant containing the multi-amine species is reacted with a quaternization agent to form a quaternized amine group.

* * * * *